US011762353B2

(12) United States Patent
Park et al.

(10) Patent No.: US 11,762,353 B2
(45) Date of Patent: Sep. 19, 2023

(54) BUILDING SYSTEM WITH A DIGITAL TWIN BASED ON INFORMATION TECHNOLOGY (IT) DATA AND OPERATIONAL TECHNOLOGY (OT) DATA

(71) Applicant: Johnson Controls Technology Company, Auburn Hills, MI (US)

(72) Inventors: Youngchoon Park, Brookfield, WI (US); Sudhi R. Sinha, Milwaukee, WI (US); Vaidhyanathan Venkiteswaran, Brookfield, WI (US); Vijaya S. Chennupati, Brookfield, WI (US); Erik S. Paulson, Madison, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 0 days.

(21) Appl. No.: 16/723,301

(22) Filed: Dec. 20, 2019

(65) Prior Publication Data
US 2020/0125053 A1 Apr. 23, 2020

Related U.S. Application Data

(63) Continuation of application No. 16/142,720, filed on Sep. 26, 2018, now Pat. No. 10,962,945.
(Continued)

(51) Int. Cl.
*G06F 16/23* (2019.01)
*G05B 19/042* (2006.01)
(Continued)

(52) U.S. Cl.
CPC ........... *G05B 19/042* (2013.01); *G06F 16/22* (2019.01); *G06F 16/2379* (2019.01);
(Continued)

(58) Field of Classification Search
USPC ........................................................ 700/276
See application file for complete search history.

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

AU 2019226217 A1 11/2020
AU 2019226264 A1 11/2020
(Continued)

OTHER PUBLICATIONS

Sjarov, et al., "The Digital Twin Concept in Industry—A Review and Systematization" 2020 25th IEEE International Conference on Emerging Technologies and Factory Automation (ETFA), Sep. 8-11, 2020, 8 pgs (Year: 2020).*
(Continued)

*Primary Examiner* — Emilio J Saavedra
(74) *Attorney, Agent, or Firm* — Foley & Lardner LLP

(57) ABSTRACT

A building management system includes an entity database, a software defined gateway, and an entity service. The entity database stores a plurality of interconnected smart entities including object entities representing a plurality of physical devices, people, or spaces and data entities representing data associated with the plurality of physical devices, people, or spaces. The smart entities are interconnected by relational objects indicating relationships between the object entities and the data entities. The software defined gateway is configured to receive information technology (IT) data and operational technology (OT) data from a plurality of different data sources. The entity service is configured to create a new smart entity in the entity database or update an existing smart entity in the entity database using the IT data and the OT data. The new or existing smart entity includes one or
(Continued)

more first attributes having values derived from the IT data and one or more second attributes having values derived from the OT data.

22 Claims, 12 Drawing Sheets

Related U.S. Application Data

(60) Provisional application No. 62/564,247, filed on Sep. 27, 2017, provisional application No. 62/612,193, filed on Dec. 29, 2017, provisional application No. 62/611,984, filed on Dec. 29, 2017, provisional application No. 62/611,974, filed on Dec. 29, 2017.

(51) Int. Cl.
*G06F 16/22* (2019.01)
*G06F 16/28* (2019.01)
*G06F 16/25* (2019.01)

(52) U.S. Cl.
CPC ............ *G06F 16/25* (2019.01); *G06F 16/288* (2019.01); *G05B 2219/2614* (2013.01)

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,567,802 B1 | 5/2003 | Popa et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,657,540 B1 | 2/2010 | Bayliss |
| 7,818,249 B2 | 10/2010 | Lovejoy et al. |
| 7,889,051 B1 | 2/2011 | Billig et al. |
| 7,917,570 B2 | 3/2011 | Ishii |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,503,330 B1 | 8/2013 | Choong et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,658,607 B2 | 5/2017 | Coogan et al. |
| 9,753,455 B2 | 9/2017 | Drees |
| 9,800,648 B2 | 10/2017 | Agarwal et al. |
| 9,811,249 B2 | 11/2017 | Chen et al. |
| 9,817,383 B1 | 11/2017 | Sinha et al. |
| 9,838,844 B2 | 12/2017 | Emeis et al. |
| 9,886,478 B2 | 2/2018 | Mukherjee |
| 9,948,359 B2 | 4/2018 | Horton |
| 10,015,069 B1 | 7/2018 | Blank |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,170,123 B2 | 1/2019 | Orr et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,389,742 B2 | 8/2019 | Devi Reddy et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,630,706 B2 | 4/2020 | Devi Reddy et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,798,175 B1 | 10/2020 | Knight et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,951,713 B2 | 3/2021 | Knight et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,275,348 B2 | 3/2022 | Park et al. |

(56) References Cited

U.S. PATENT DOCUMENTS

| | | |
|---|---|---|
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2005/0289467 A1 | 12/2005 | Imhof et al. |
| 2006/0067209 A1* | 3/2006 | Sheehan ............... H04L 67/125 370/216 |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1* | 10/2010 | Fata .................... G06F 11/3048 700/7 |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2011/0264725 A1 | 10/2011 | Haeberle et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0072480 A1 | 3/2012 | Hays et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0085719 A1 | 4/2013 | Brun et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0212685 A1 | 8/2013 | Kelley et al. |
| 2013/0226320 A1* | 8/2013 | Berg-Sonne ....... G06Q 10/0631 700/90 |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0268128 A1 | 10/2013 | Casilli et al. |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2013/0339292 A1* | 12/2013 | Park .................... G06F 16/2471 707/747 |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0205155 A1 | 7/2014 | Chung et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0112763 A1 | 4/2015 | Goldschneider |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0312696 A1 | 10/2015 | Ribbich et al. |
| 2015/0316907 A1 | 11/2015 | Elbsat et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |

(56) References Cited

U.S. PATENT DOCUMENTS

| | | |
|---|---|---|
| 2015/0356419 A1 | 12/2015 | Shircliff et al. |
| 2015/0379080 A1 | 12/2015 | Jochimski |
| 2016/0011753 A1 | 1/2016 | McFarland et al. |
| 2016/0014070 A1 | 1/2016 | Adkins |
| 2016/0020946 A1 | 1/2016 | Morper |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0071056 A1 | 3/2016 | Ellison et al. |
| 2016/0078229 A1 | 3/2016 | Gong et al. |
| 2016/0090839 A1 | 3/2016 | Stolarczyk |
| 2016/0109867 A1 | 4/2016 | Wada et al. |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0203036 A1 | 7/2016 | Mezic et al. |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0255139 A1 | 9/2016 | Rathod |
| 2016/0260063 A1 | 9/2016 | Harris et al. |
| 2016/0277374 A1 | 9/2016 | Reid et al. |
| 2016/0292303 A1 | 10/2016 | Hong et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0342906 A1 | 11/2016 | Shaashua et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0054594 A1 | 2/2017 | Decenzo et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0091277 A1* | 3/2017 | Zoch .................. G06F 16/2423 |
| 2017/0093700 A1 | 3/2017 | Gilley et al. |
| 2017/0093915 A1* | 3/2017 | Ellis .................. H04W 12/08 |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0118236 A1 | 4/2017 | Devi Reddy et al. |
| 2017/0118237 A1 | 4/2017 | Devi Reddy et al. |
| 2017/0118240 A1 | 4/2017 | Devi Reddy et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0205099 A1 | 7/2017 | Sanghamitra |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0286572 A1 | 10/2017 | Hershey et al. |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357607 A1 | 12/2017 | Cayemberg et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0119975 A1 | 5/2018 | Park et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0232422 A1 | 8/2018 | Park et al. |
| 2018/0232423 A1 | 8/2018 | Park et al. |
| 2018/0232459 A1 | 8/2018 | Park et al. |
| 2018/0239322 A1 | 8/2018 | Matsuo et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0309818 A1 | 10/2018 | Park et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0003297 A1 | 1/2019 | Brannigan et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0074994 A1 | 3/2019 | Becker et al. |
| 2019/0088106 A1 | 3/2019 | Grundstrom |
| 2019/0094824 A1 | 3/2019 | Xie et al. |
| 2019/0095644 A1 | 3/2019 | Park et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0138662 A1* | 5/2019 | Deutsch .................. G06F 30/00 |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0258620 A1 | 8/2019 | Itado et al. |
| 2019/0268178 A1 | 8/2019 | Fairweather et al. |
| 2019/0310979 A1 | 10/2019 | Masuzaki et al. |
| 2019/0361411 A1 | 11/2019 | Park et al. |
| 2019/0361412 A1 | 11/2019 | Park et al. |
| 2019/0377306 A1 | 12/2019 | Harvey |
| 2020/0159173 A1 | 5/2020 | Goyal |
| 2020/0159182 A1 | 5/2020 | Goyal |
| 2020/0159376 A1 | 5/2020 | Goyal |
| 2020/0159723 A1 | 5/2020 | Goyal |
| 2020/0226156 A1 | 7/2020 | Borra et al. |
| 2020/0285203 A1 | 9/2020 | Thakur et al. |

(56) References Cited

U.S. PATENT DOCUMENTS

| | | |
|---|---|---|
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0044957 A1 | 2/2021 | Norp et al. |
| 2021/0118067 A1 | 4/2021 | Muenz et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0215264 A1 | 7/2022 | Harvey et al. |
| 2022/0282881 A1 | 9/2022 | Sinha et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0214555 A1 | 7/2023 | Harvey et al. |

FOREIGN PATENT DOCUMENTS

| | | |
|---|---|---|
| AU | 2019351573 A1 | 5/2021 |
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |

OTHER PUBLICATIONS

Brick: Metadata schema for portable smart building applications, dated Feb. 12, 2018, 20 pages.

Brick: Metadata schema for portable smart building applications, dated Sep. 15, 2018, 3 pages, (Abstract).

Brick: Towards a Unified Metadata Schema for Buildings, dated Feb. 11, 2018, 10 pages.

International Search Report and Written Opinion on PCT/US2017/052060, dated Oct. 5, 2017, 11 pages.

International Search Report and Written Opinion on PCT/US2017/052633, dated Oct. 23, 2017, 9 pages.

International Search Report and Written Oopinion on PCT/US2017/052829, dated Nov. 27, 2017, 24 pages.

International Search Report and Written Opinion on PCT/US2018/024068, dated Jun. 15, 2018, 22 pages.

International Search Report and Written Opinion on PCT/US2018/052974, dated Dec. 19, 2018, 13 pages.

International Search Report and Written Opinion on PCT/US2018/052975, dated Jan. 2, 2019, 13 pages.

International Search Report and Written Opinion on PCT/US2018/052994, dated Jan. 7, 2019, 15 pages.

Li et al., Event Stream Processing with Out-of-Order Data Arrival, International Conferences on Distributed Computing Systems, 2007, 8 pages.

Scrabble: Transferrable Semi-Automated Semantic Metadata Normalization using Intermediate Representation, Dated Nov. 7-8, 2018, 10 pages.

Wei Su et al., "Development and Implementation of Software Gateways of Fire Fighting Subsystem Running on EBI," Control, Automation and Systems Engineering, Jul. 2009. IITA International Conference on, IEEE, pp. 9-12.

Balaji et al, Brick: Metadata schema for portable smart building applications, dated Sep. 25, 2017, 20 pages.

Balaji et al, Brick: Towards a Unified Metadata Schema for Buildings, dated Nov. 16-17, 2016, 10 pages.

Balaji et al, Demo Abstract: Portable Queries Using the Brick Schema for Building Applications, dated Nov. 16-17, 2016, 2 pages.

Brick: Towards a Unified Metadata Schema For Buildings, dated Nov. 16, 2016, 46 pages.

Fierro et al., Beyond a House of Sticks: Formalizing Metadata Tags with Brick, dated Nov. 13-14, 2019, 10 pages.

Fierro et al., Dataset: An Open Dataset and Collection Tool for BMS Point Labels, dated Nov. 10, 2019, 3 pages.

Fierro et al., Design and Analysis of a Query Processor for Brick, dated Jan. 2018, 25 pages.

Fierro et al., Design and Analysis of a Query Processor for Brick, dated Nov. 8-9, 2017, 10 pages.

Fierro et al., Mortar: An Open Testbed for Portable Building Analytics, dated Nov. 7-8, 2018, 10 pages.

Fierro, Writing Portable Building Analytics with the Brick Metadata Schema, UC Berkeley ACM E-Energy, 39 pages, dated 2019.

Gao et al., A large-scale evaluation of automated metadata inference approaches on sensors from air handling units, dated May 1, 2018, pp. 13-40.

Koh et al., Plaster: An Integration, Benchmark, and Development Framework for Metadata Normalization Methods, dated Nov. 7-8, 2018, 10 pages.

Koh et al., Scrabble: Transferrable Semi-Automated Semantic Metadata Normalization using Intermediate Representation, dated Nov. 7-8, 2018, 10 pages.

Koh et al., Who can Access What, and When?, dated Nov. 13-14, 2019, 4 pages.

Bhattacharya et al., Short Paper: Analyzing Metadata Schemas for Buildings—The Good, The Bad and The Ugly, ACM, Nov. 4-5, 2015, 4 pages.

(56) References Cited

OTHER PUBLICATIONS

Building Blocks for Smart Buildings, BrickSchema.org, Mar. 2019, 17 pages.
Extended European Search Report issued in EP Application No. 18196948.6 dated Apr. 10, 2019, 9 pages.
International Search Report and Written Opinion for PCT/US2017/013831, dated Mar. 31, 2017, 14 pages.
International Search Report and Written Opinion for PCT/US2017/035524, dated Jul. 24, 2017, 14 pages.
International Search Report and Written Opinion on PCT/US2018/052971, dated Mar. 1, 2019, 19 pages.
International Search Report and Written Opinion on PCT/US2019/015481, dated May 17, 2019, 78 pages.
Results of the Partial International Search for PCT/US2018/052971, dated Jan. 3, 2019, 3 pages.
"Graphs in Computer Science", URL: https://web.archive.org/web/20121129031534/http://web.cecs.pdx.edu/-sheard/course/Cs163/Doc/Graphs.html, retrieved Sep. 28, 2020, 10 pages.
"Resource Description Framework (RDF): Concepts and Abstract Syntax", W3C Recommendation, Feb. 10, 2004, URL: https://www.w3.org/TR/rdf-concepts/#dfn-rdf-triple, retrieved Sep. 28, 2020, 18 pages.
Bhattacharya et al., Short Paper: Analyzing Metadata Schemas for Buildings—The Good, The Bad and The Ugly, ACM, dated Nov. 4-5, 2015, 4 pages.
Building Blocks for Smart Buildings, BrickSchema.org, dated Mar. 2019, 17 pages.
Fierro et al., Why Brick is a Game Changer for Smart Buildings, Memoori Webinar, 2019, 67 pages.
Metadata Schema for Buildings, Brickschema.org, Retrieved Dec. 24, 2019, 3 pages.
Priyadarshana et al., "Multi-agent Controlled Building Management System," International Conference on Innovation in Power and Advanced Computing Technologies, 5 pages, Apr. 21, 2017.
European Office Action on EP Appl. No. 19707156.6 dated Jul. 5, 2022 (9 pages).
U.S. Appl. No. 17/566,029, Passivelogic, Inc.
U.S. Appl. No. 17/567,275, Passivelogic, Inc.
U.S. Appl. No. 17/722,115, Passivelogic, Inc.
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Dec. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing Ltd., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

(56) References Cited

OTHER PUBLICATIONS

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3C, "SPARQL: Query Language for RDF," located on the Wayback Machine, URL: https://web.archive.org/web/20161230061728/http://www.w3.org/TR/rdf-sparql-query/), retrieved from internet Nov. 15, 2022 (89 pages).

Zhou, Q. et al., "Knowledge-infused and Consistent Complex Event Processing over Real-time and Persistent Streams," Further Generation Computer Systems, 2017, 76 (pp. 391-406).

White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).

* cited by examiner

BUILDING SYSTEM WITH A DIGITAL TWIN BASED ON INFORMATION TECHNOLOGY (IT) DATA AND OPERATIONAL TECHNOLOGY (OT) DATA

CROSS-REFERENCE TO RELATED PATENT APPLICATIONS

This application is a Continuation of U.S. application Ser. No. 16/142,720, filed Sep. 26, 2018, which claims the benefit of and priority to U.S. Provisional Application No. 62/564,247, filed Sep. 27, 2017, U.S. Provisional Application No. 62/612,193, filed Dec. 29, 2017, U.S. Provisional Application No. 62/611,984, filed Dec. 29, 2017, and U.S. Provisional Application No. 62/611,974, filed Dec. 29, 2017. Each of these applications is incorporated herein by reference in its entirety.

BACKGROUND

The present disclosure relates generally to a building management system and more particularly to a building management system configured to ingest, process, and store data from a variety of different data sources. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS can collect data from sensors and other types of building equipment. BMSs typically rely on hardware gateway devices to collect and pre-process data before the data is provided to the BMS. Different gateways use different data ingestion techniques and software that often do not communicate using the same protocols or data models. Accordingly, maintenance and integration cost can be high when multiple gateways must work together to collect and provide data to a building management system. It would be desirable to provide a solution that overcomes these and other problems associated with traditional gateway devices.

SUMMARY

One implementation of the present disclosure is a building management system including an entity database, a software defined gateway, and an entity service. The entity database stores a plurality of interconnected smart entities. The smart entities include object entities representing a plurality of devices of building equipment, people within a building, or spaces within the building. The smart entities include data entities representing data associated with the plurality of devices of building equipment, people within the building, or spaces within the building. The smart entities are interconnected by relational objects indicating relationships between the object entities and the data entities. The software defined gateway is configured to receive information technology (IT) data and operational technology (OT) data from a plurality of different data sources. The IT data describe one or more characteristics of the plurality of devices of building equipment, people within the building, or spaces within the building, the characteristics being static or changing at a first rate. The OT data describe one or more states or conditions of plurality of devices of building equipment, people within the building, or spaces within the building, the states or conditions being dynamic or changing at a second rate faster than the first rate. The entity service is configured to create a new smart entity in the entity database or update an existing smart entity in the entity database using the IT data and the OT data. The new or existing smart entity includes one or more static attributes having values derived from the IT data and one or more dynamic attributes having values derived from the OT data.

In some embodiments, the software defined gateway is configured to use a different communications protocol to communicate with each of the plurality of different data sources, the communication protocols comprising at least one of BACnet, Modbus, LonTalk, SQL, JMS, AMQP, MQTT, FTP, or HTTP.

In some embodiments, the plurality of data sources include at least two of internet of things (IoT) devices, building equipment, a weather service, a news service, a document service, or a media service.

In some embodiments, the smart entity is a virtual representation of a physical system or building equipment device, person or group of people within the building, or space or group of spaces within the building.

In some embodiments, the entity service is configured to transform the one or more static characteristics of the building equipment device, person within the building, or space within the building into the one or more static attributes of the smart entity.

In some embodiments, the IT data describe at least one of a relationship between the building equipment device and other building equipment devices or a relationship between the building equipment device and the space within the building.

In some embodiments, the entity service is configured to transform the one or more dynamic states or conditions of the building equipment device, person within the building, or space within the building into the one or more dynamic attributes of the smart entity.

In some embodiments, the OT data comprise event data received in real-time from building equipment installed within a building. In some embodiments, the building equipment includes a chiller, a boiler, a sensor, a cooling tower, and air handling unit, a rooftop unit, a variable air volume unit, lighting equipment, security equipment, or fire detection equipment.

In some embodiments, the OT data include data samples collected from building equipment comprising at least one of sensors, actuators, electronics, vehicles, or home appliances.

In some embodiments, the OT data include data samples collected from building equipment devices comprising at least one of smart home hub devices, smart house devices, doorbell cameras, air quality sensors, smart thermostats, smart switches, smart lights, smart appliances, garage door openers, smart building equipment, or smoke detectors.

In some embodiments, wherein the OT data include data samples collected from internet of things (IoT) devices comprising at least one of heart monitoring implants, biochip transponders, cameras streaming live feeds, automobiles with built-in sensors, DNA analysis devices, field operation devices, or tracking devices for people/vehicles/equipment.

In some embodiments, the OT data include data samples collected from building equipment devices comprising at least one of networked sensors, wireless sensors, wearable sensors, environmental sensors, RFID gateways and readers, IoT gateway devices, robots and other robotic devices, GPS devices, smart watches, or virtual/augmented reality devices.

In some embodiments, the OT data include samples of data points received in real-time from building equipment.

In some embodiments, the entity service is configured to create and manage a plurality of smart entities including one or more object entities representing a plurality of physical building equipment devices, one or more data entities representing data generated by the physical building equipment devices, and one or more relational objects indicating relationships interconnecting the object entities and the data entities.

In some embodiments, a first smart entity of the plurality of interconnected smart entities includes a first attribute identifying a physical building equipment device represented by the smart entity and a second attribute storing a most recent value of a dynamic variable associated with the physical building equipment device.

In some embodiments, the entity service is configured to create and manage the plurality of interconnected smart entities. The object entities may include a first object entity representing a physical building equipment device. The data entities may include a timeseries representing data generated by the physical building equipment device. The timeseries includes a first attribute identifying the object entity and a second attribute storing a most recent value of a dynamic variable associated with the physical building equipment device.

In some embodiments, the entity service is configured to create and manage a plurality of smart entities including an object entity representing a physical building equipment device, a data entity representing data generated by the physical building equipment device, and a relational object comprising a first attribute identifying the object entity and a second attribute identifying the data entity.

Another implementation of the present disclosure is a building management system for managing data relating to a plurality of physical building equipment devices connected to one or more electronic communications networks. The building management system includes one or more computer-readable storage media having instructions stored thereon. When executed by one or more processors, the instructions cause the one or more processors to store a plurality of interconnected smart entities in an entity base. The smart entities include object entities representing a plurality of devices of building equipment, people within a building, or spaces within the building. The smart entities include data entities representing data associated with the plurality of devices of building equipment, people within the building, or spaces within the building. The smart entities are interconnected by relational objects indicating relationships between the object entities and the data entities. The instructions cause the one or more processors to receive information technology (IT) data and operational technology (OT) data from a plurality of different data sources. The IT data describe one or more characteristics of the plurality of devices of building equipment, people within the building, or spaces within the building, the characteristics being static or changing at a first rate. The OT data describe one or more states or conditions of the plurality of devices of building equipment, people within the building, or spaces within the building, the states or conditions being dynamic or changing at a second rate faster than the first rate. The instructions cause the one or more processors to create a new smart entity in the entity database or update an existing smart entity in the entity database using the IT data and the OT data, the new or existing smart entity including one or more first attributes having values derived from the IT data and one or more second attributes having values derived from the OT data.

In some embodiments, the instructions cause the one or more processors to use a different communications protocol to communicate with each of the plurality of different data sources, the communication protocols comprising at least one of BACnet, Modbus, LonTalk, SQL, JMS, AMQP, MQTT, FTP, or HTTP.

In some embodiments, the plurality of data sources include at least two of internet of things (IoT) devices, building equipment, a weather service, a news service, a document service, or a media service.

In some embodiments, the smart entity is a virtual representation of a physical system or device of building equipment, person within the building or group of people, or space or group of spaces within the building.

In some embodiments, the instructions cause the one or more processors to transform the one or more static characteristics of the building equipment device, person within the building, or space within the building into the one or more static attributes of the smart entity.

In some embodiments, the IT data describe at least one of a relationship between the building equipment device and other building equipment devices or a relationship between the building equipment device and the space within the building.

In some embodiments, the instructions cause the one or more processors to transform the one or more dynamic states or conditions of the building equipment device, person within the building, or space within the building into the one or more dynamic attributes of the smart entity.

In some embodiments, the OT data include event data received in real-time from building equipment installed within a building. In some embodiments, the building equipment includes a chiller, a boiler, a sensor, a cooling tower, and air handling unit, a rooftop unit, a variable air volume unit, lighting equipment, security equipment, or fire detection equipment.

In some embodiments, the OT data include data samples collected from internet of things (IoT) devices comprising at least one of physical devices of building equipment, sensors, actuators, electronics, vehicles, or home appliances.

In some embodiments, the OT data include data samples collected from building equipment devices comprising at least one of smart home hub devices, smart house devices, doorbell cameras, air quality sensors, smart thermostats, smart switches, smart lights, smart appliances, garage door openers, smart building equipment, or smoke detectors.

In some embodiments, the OT data include data samples collected from internet of things (IoT) devices comprising at least one of heart monitoring implants, biochip transponders, cameras streaming live feeds, automobiles with built-in sensors, DNA analysis devices, field operation devices, or tracking devices for people/vehicles/equipment.

In some embodiments, the OT data include data samples collected from building equipment devices comprising at least one of networked sensors, wireless sensors, wearable sensors, environmental sensors, RFID gateways and readers, IoT gateway devices, robots and other robotic devices, GPS devices, smart watches, or virtual/augmented reality devices.

In some embodiments, the OT data include samples of data points received in real-time from building equipment devices.

In some embodiments, the instructions cause the one or more processors to create and manage a plurality of smart entities including one or more object entities representing a plurality of physical building equipment devices, one or more data entities representing data generated by the physical building equipment devices, and one or more relational objects indicating relationships interconnecting the object entities and the data entities.

In some embodiments, a first smart entity of the plurality of interconnected smart entities comprises a first attribute identifying a physical building equipment device represented by the first smart entity and a second attribute storing a most recent value of a dynamic variable associated with the physical building equipment device.

In some embodiments, the instructions cause the one or more processors to create and manage the plurality of interconnected smart entities. The object entities may include a first object entity representing a physical building equipment device. The data entities may include a timeseries representing data generated by the physical building equipment device. The timeseries includes a first attribute identifying the first object entity and a second attribute storing a most recent value of a dynamic variable associated with the physical building equipment device.

In some embodiments, the instructions cause the one or more processors to create and manage a plurality of smart entities including an object entity representing a physical building equipment device, a data entity representing data generated by the physical building equipment device, and a relational object comprising a first attribute identifying the object entity and a second attribute identifying the data entity.

Another implementation of the present disclosure is a method for managing data relating to a plurality of physical building equipment devices connected to one or more electronic communications networks. The method includes storing a plurality of interconnected smart entities in an entity base. The smart entities include object entities representing a plurality of devices of building equipment, people within a building, or spaces within the building. The smart entities include data entities representing data associated with the plurality of devices of building equipment, people within the building, or spaces within the building. The smart entities are interconnected by relational objects indicating relationships between the object entities and the data entities. The method includes receiving information technology (IT) data and operational technology (OT) data from a plurality of different data sources. The IT data describe one or more characteristics of the plurality of devices of building equipment, people within the building, or spaces within the building, the characteristics being static or changing at a first rate. The OT data describe one or more states or conditions of the plurality of devices of building equipment, people within the building, or spaces within the building, the states or conditions being dynamic or changing at a second rate faster than the first rate. The method includes creating a new smart entity in the entity database or updating an existing smart entity in the entity database using the IT data and the OT data. The new or existing smart entity includes one or more first attributes having values derived from the IT data and one or more second attributes having values derived from the OT data.

In some embodiments, the method includes using a different communications protocol to communicate with each of the plurality of different data sources, the communication protocols comprising at least one of BACnet, Modbus, LonTalk, SQL, JMS, AMQP, MQTT, FTP, or HTTP.

In some embodiments, the plurality of data sources include at least two of internet of things (IoT) devices, building equipment, a weather service, a news service, a document service, or a media service.

In some embodiments, the smart entity is a virtual representation of a physical system or device of building equipment, person or group of people within the building, or space or group of spaces within the building.

In some embodiments, the method includes transforming the one or more static characteristics of the device, person within the building, or space within the building into the one or more static attributes of the smart entity.

In some embodiments, the IT data describe at least one of a relationship between the building equipment device and other building equipment devices or a relationship between the building equipment device and the space within the building.

In some embodiments, the method includes transforming the one or more dynamic states or conditions of the building equipment device, person within the building, or space within the building into the one or more dynamic attributes of the smart entity.

In some embodiments, the OT data include event data received in real-time from building equipment installed within a building. In some embodiments, the building equipment includes a chiller, a boiler, a sensor, a cooling tower, and air handling unit, a rooftop unit, a variable air volume unit, lighting equipment, security equipment, or fire detection equipment.

In some embodiments, the OT data include data samples collected from internet of things (IoT) devices comprising at least one of physical devices of building equipment, sensors, actuators, electronics, vehicles, or home appliances.

In some embodiments, the OT data include data samples collected from building equipment devices comprising at least one of smart home hub devices, smart house devices, doorbell cameras, air quality sensors, smart thermostats, smart switches, smart lights, smart appliances, garage door openers, smart building equipment, or smoke detectors.

In some embodiments, the OT data include data samples collected from internet of things (IoT) devices comprising at least one of heart monitoring implants, biochip transponders, cameras streaming live feeds, automobiles with built-in sensors, DNA analysis devices, field operation devices, or tracking devices for people/vehicles/equipment.

In some embodiments, the OT data include data samples collected from building equipment devices comprising at least one of networked sensors, wireless sensors, wearable sensors, environmental sensors, RFID gateways and readers, IoT gateway devices, robots and other robotic devices, GPS devices, smart watches, or virtual/augmented reality devices.

In some embodiments, the OT data include samples of data points received in real-time from building equipment devices.

In some embodiments, the method includes creating and managing a plurality of smart entities including one or more object entities representing a plurality of physical building equipment devices, one or more data entities representing data generated by the physical building equipment devices, and one or more relational objects indicating relationships interconnecting the object entities and the data entities.

In some embodiments, the smart entity comprises a static attribute identifying a physical building equipment device represented by the smart entity and a dynamic attribute storing a most recent value of a dynamic variable associated with the physical building equipment device.

In some embodiments, the method includes creating and managing a plurality of smart entities including an object entity representing a physical building equipment device and a data entity representing data generated by the physical building equipment device. The data entity includes a static attribute identifying the object entity and a dynamic attribute storing a most recent value of a dynamic variable associated with the physical building equipment device.

In some embodiments, the method includes creating and managing a plurality of smart entities including an object entity representing a physical building equipment device, a data entity representing data generated by the physical building equipment device, and a relational object comprising a first attribute identifying the object entity and a second attribute identifying the data entity.

Another implementation of the present disclosure is one or more non-transitory computer readable media containing program instructions. When executed by one or more processors, the instructions cause the one or more processors to perform operations including receiving information technology (IT) data and operational technology (OT) data from a plurality of different data sources. The IT data describe one or more static characteristics of a building equipment device, person within a building, or space within the building. The OT data describe one or more dynamic states or conditions of a building equipment device, person within the building, or space within the building. The instructions cause the one or more processors to create a smart entity including one or more static attributes having values derived from the IT data and one or more dynamic attributes having values derived from the OT data.

In some embodiments, the instructions cause the one or more processors to use a different communications protocol to communicate with each of the plurality of different data sources, the communication protocols comprising at least one of BACnet, Modbus, or LonTalk.

In some embodiments, the plurality of data sources include at least two of internet of things (IoT) devices, building equipment, a weather service, a news service, a document service, or a media service.

In some embodiments, the smart entity is a virtual representation of a physical system or device of building equipment, person or group of people within the building, or space or group of spaces within the building.

In some embodiments, the instructions cause the one or more processors to transform the one or more static characteristics of the building equipment device, person within the building, or space within the building into the one or more static attributes of the smart entity.

In some embodiments, the IT data describe at least one of a relationship between the building equipment device and other building equipment devices or a relationship between the building equipment device and the space within the building.

In some embodiments, the instructions cause the one or more processors to transform the one or more dynamic states or conditions of the building equipment device, person within the building, or space within the building into the one or more dynamic attributes of the smart entity.

In some embodiments, the OT data include event data received in real-time from HVAC equipment installed within a building. In some embodiments, the HVAC equipment includes a chiller, a boiler, a sensor, a cooling tower, and air handling unit, a rooftop unit, or a variable air volume unit.

In some embodiments, the OT data include data samples collected from internet of things (IoT) devices comprising at least one of physical devices of building equipment, sensors, actuators, electronics, vehicles, or home appliances.

In some embodiments, the OT data include data samples collected from building equipment devices comprising at least one of smart home hub devices, smart house devices, doorbell cameras, air quality sensors, smart thermostats, smart switches, smart lights, smart appliances, garage door openers, smart building equipment, or smoke detectors.

In some embodiments, the OT data include data samples collected from internet of things (IoT) devices comprising at least one of heart monitoring implants, biochip transponders, cameras streaming live feeds, automobiles with built-in sensors, DNA analysis devices, field operation devices, or tracking devices for people/vehicles/equipment.

In some embodiments, the OT data include data samples collected from building equipment devices comprising at least one of networked sensors, wireless sensors, wearable sensors, environmental sensors, RFID gateways and readers, IoT gateway devices, robots and other robotic devices, GPS devices, smart watches, or virtual/augmented reality devices.

In some embodiments, the OT data include samples of data points received in real-time from building equipment devices.

In some embodiments, the instructions cause the one or more processors to create and manage a plurality of smart entities including one or more object entities representing a plurality of physical building equipment devices, one or more data entities representing data generated by the physical building equipment devices, and one or more relational objects indicating relationships interconnecting the object entities and the data entities.

In some embodiments, the smart entity comprises a static attribute identifying a physical building equipment device represented by the smart entity and a dynamic attribute storing a most recent value of a dynamic variable associated with the physical building equipment device.

In some embodiments, the instructions cause the one or more processors to create and manage a plurality of smart entities including an object entity representing a physical building equipment device and a data entity representing data generated by the physical building equipment device. The data entity includes a static attribute identifying the object entity and a dynamic attribute storing a most recent value of a dynamic variable associated with the physical building equipment device.

In some embodiments, the instructions cause the one or more processors to create and manage a plurality of smart entities including an object entity representing a physical building equipment device, a data entity representing data generated by the physical building equipment device, and a relational object comprising a first attribute identifying the object entity and a second attribute identifying the data entity.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a building management system and components thereof are shown, according to some embodiments. The building management system includes a software defined gateway and several platform services (e.g., a timeseries service, an entity service, a security service, an analytics service, etc.). The software defined gateway is configured to translate between a protocol or format used by the platform services and a variety of other protocols or formats used by external systems or devices that communicate with the building management system. This allows the building management system to ingest and process inbound data from a variety of different data sources and provide data to a variety of different external systems or devices.

The entity service is configured to create and manage smart entities. The smart entities include attributes that describe a corresponding system, device, person, relationship, or other items represented by the smart entities. In some embodiments, the attributes include both static and dynamic attributes. The entity service can use information technology (IT) data received from external systems or devices to generate values for the static attributes of the smart entities. Similarly, the entity service can use operational technology (OT) data received from external systems or devices to generate values for the dynamic attributes of the smart entities. These and other features of the building management system are described in greater detail below.

Data Ingestion System

Figure 1:
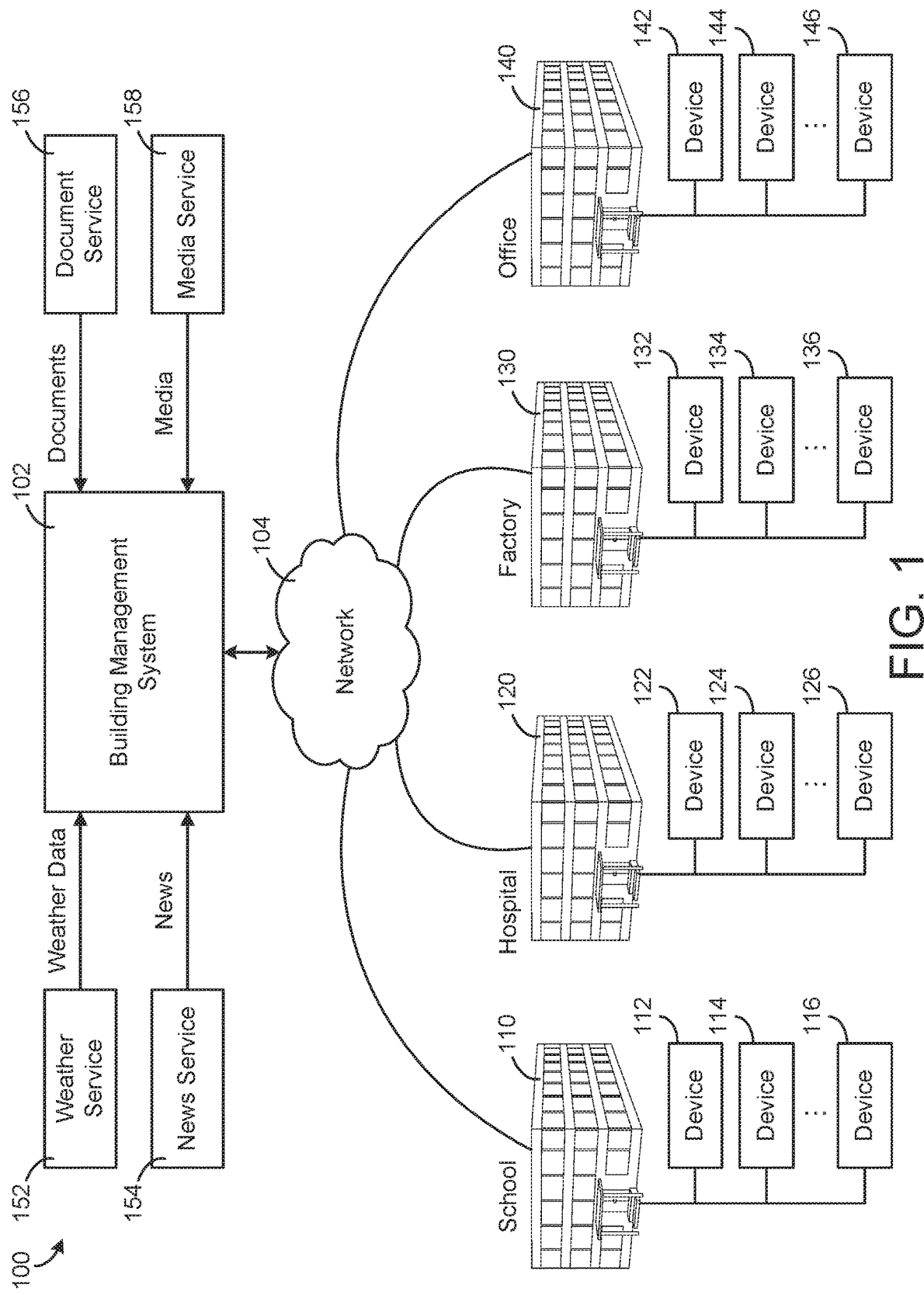
FIG. 1 is a block diagram of a data ingestion system including a building management system, according to some embodiments.

Referring now to FIG. 1, a block diagram of a data ingestion system 100 is shown, according to an exemplary embodiment. Data ingestion system 100 is shown to include a building management system 102. Building management system 102 can be configured to collect data from a variety of different data sources. For example, building management system 102 is shown collecting data from several buildings including a school 120, hospital 130, factory 140, and office 150. Although only a few examples of buildings are shown in FIG. 1, it should be understood that building management system 102 can collect data from any type of building including, for example, educational buildings (e.g., schools, universities, libraries, etc.), health care buildings (e.g., hospitals, outpatient facilities, clinics, etc.), industrial facilities (e.g., factories, manufacturing facilities, warehouses, etc.), commercial facilities (e.g., retail stores, grocery stores, distribution centers, etc.), offices, transportation facilities (e.g. airports, train stations, car rental facilities, etc.), residential buildings (e.g., apartment buildings, homes, hotels, etc.), government buildings, or any other type of building.

Building management system 102 can collect data from a variety of devices 112-116, 122-126, 132-136, and 142-146. In some embodiments, devices 112-116, 122-126, 132-136, and 142-146 are located within buildings 120, 130, 140, and 150. For example, devices 112-116, 122-126, 132-136, and 142-146 can include smart home hub devices, smart house devices, doorbell cameras, air quality sensors, smart thermostats, smart switches, smart lights, smart appliances, garage door openers, smart building equipment, smoke detectors, or other types of building devices. In some embodiments, devices 112-116, 122-126, 132-136, and 142-146 are internet of things (IoT) devices. For example, devices 112-116, 122-126, 132-136, and 142-146 may include physical devices, sensors, actuators, electronics, vehicles, home appliances, and/or other items having network connectivity which enable IoT devices 203 to communicate with building management system 102. Several examples of IoT devices which can provide data to building management system 102 are described in detail with reference to FIG. 1. While the devices described herein are generally referred to as IoT devices, it should be understood that, in various embodiments, the devices references in the present disclosure could be any type of devices capable to communication of data over an electronic network.

Building management system 102 can collect data from a variety of external systems or services. For example, building management system 102 is shown receiving weather data from a weather service 152, news data from a news service 154, documents and other document-related data from a document service 156, and media (e.g., video, images, audio, social media, etc.) from a media service 158. In some embodiments, building management system 102 generates data internally. For example, building management system 102 may include a web advertising system, a website traffic monitoring system, a web sales system, or other types of platform services that generate data. The data generated by building management system 102 can be collected, stored, and processed along with the data received from other data sources. Building management system 102 can collect data directly from external systems or devices or via a network 104 (e.g., a WAN, the Internet, a cellular network, etc.). Building management system 102 can process and transform collected data to generate timeseries data and entity data. In some embodiments, building management system 102 includes some or all of the features of the data platform described in U.S. Provisional Patent Application No. 62/564,247 filed Sep. 27, 2017, the entire disclosure of which is incorporated by reference herein. Several features of building management system 102 are described in detail below.

Building Management System

Figure 2:
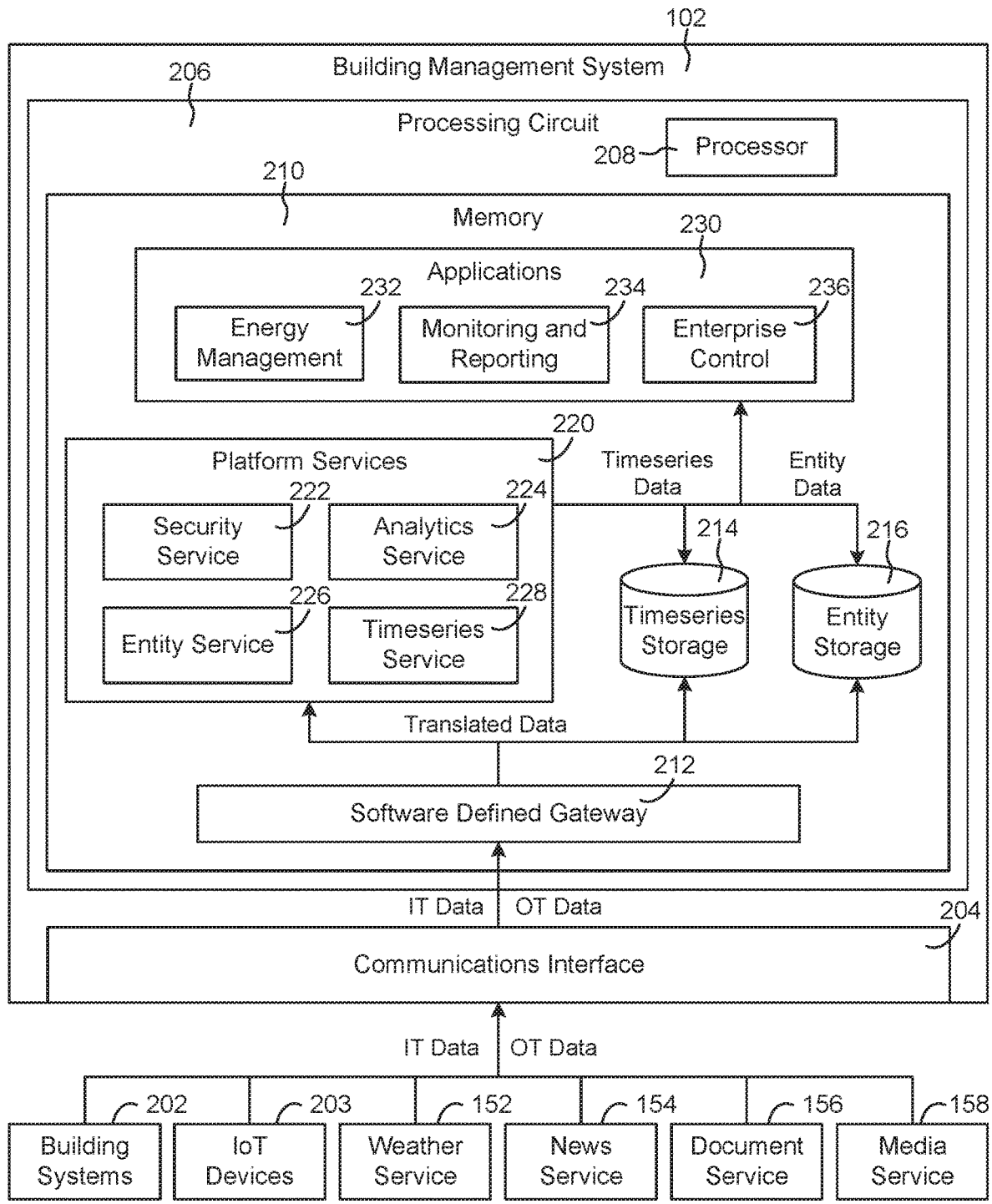
FIG. 2 is a block diagram illustrating the building management system of FIG. 1 in greater detail including a software defined gateway, platform services, and application, according to some embodiments.

Referring now to FIG. 2, a block diagram illustrating building management system 102 in greater detail is shown, according to some embodiments. Building management system 102 can be configured to collect data from a variety of different data sources. For example, building management system 102 is shown collecting data from building systems 202, internet of things (IoT) devices 203, weather service 152, news service 154, document service 156, and media service 158. In some embodiments, building management system 102 separates data collection/ingestion; data storage, retrieval, and analysis; and data visualization into three different layers. This allows building management system to support a variety of applications 230 that use the data and allows new applications 230 to reuse the existing infrastructure provided by platform services 220.

Building systems 202 can include any type of system configured to manage, monitor, control, or operate a building or a portion thereof. For example, building systems 202 may include a fire safety system, a lift/escalator system, an electrical system, an information and communications technology (ICT) system, a security system, a HVAC system, a refrigeration system, a lighting system, an advertising or signage system a home control system, and/or other types of building control systems. Building systems 202 can also include any type of system configured to manage information associated with occupants of a building and/or the activities thereof. For example, building systems 202 can include a human resources (HR) system, an accounting system, a payroll system, a building information system, a customer relationship management (CRM) system, a marketing system, an enterprise resource planning system, or any other type of system that can be used by occupants of a building. In some embodiments, building systems 202 can include any of the building subsystems, building equipment, or other types of building devices. Several examples of such devices are described in detail in U.S. patent application Ser. No. 15/644,560 filed Jul. 7, 2017, the entire disclosure of which is incorporated by reference herein.

IoT devices 203 may include any of a variety of physical devices, sensors, actuators, electronics, vehicles, home appliances, and/or other items having network connectivity which enable IoT devices 203 to communicate with building management system 102. For example, IoT devices 203 can include smart home hub devices, smart house devices, doorbell cameras, air quality sensors, smart thermostats, smart switches, smart lights, smart appliances, garage door openers, smart building equipment, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. In some embodiments, IoT devices 203 include some or all of devices 112-116, 122-126, 132-136, and 142-146, as described with reference to FIG. 1.

Weather service 152, news service 154, document service 156, and media service 158 may be the same as previously described. For example, weather service 152 can be configured to provide weather data to building management system 102. News service 154 can be configured to provide news data to building management system 102. Document service 156 can be configured to provide documents and other document-related data to building management system 102. Media service 158 can be configured to provide media (e.g., video, images, audio, social media, etc.) to building management system 102. In some embodiments, media service 158 includes an internet-based advertising system or click tracking system. For example, media service 158 can provide event data to building management system 102 in response to a web server delivering a webpage, advertisement, or receiving a click from a user. Building management system 102 can be configured to ingest, process, store, and/or publish data from these and any of a variety of other data sources.

Building management system 102 is shown receiving two main types of data: information technology (IT) data and operational technology (OT) data. IT data may include any type of data related to information technology in or around a building. In some embodiments, information technology includes the use of computers to store, retrieve, transmit, and manipulate data or information in the context of a business or other enterprise. Information technology can be considered a subset of information and communications technology (ICT) and may encompass other information distribution technologies such as television and telephones. Information technology may include computer hardware, software, electronics, semiconductors, internet, telecom equipment, and e-commerce.

IT data may include data that describes various entities (e.g., people, spaces, devices, etc.) and the relationships therebetween. For example, IT data may include an entity graph that describes the relationships between spaces, equipment, and other entities (e.g., chiller A provides chilled fluid to air handling unit B, air handling unit B provides airflow to room C, temperature sensor D located in room C, person E part of employee team F, floor G contains room C, etc.). Alternatively, the entity graph can be inferred from the IT data or constructed from the IT data. IT data may include human resources data that describes a set of employees and includes details about the employees (e.g., name, employee ID, job title/role, responsibilities, payroll information, address, etc.). IT data may include building information data that describes a building, building spaces, or building equipment. For example, IT data may include a building information model (BIM), building space information (e.g., a space hierarchy, space relationships, space attributes, etc.), IoT device information (e.g., device locations, descriptions, device relationships, etc.), and/or other information that provides context for the data received by building management system 102 or describes the entities managed by building management system 102. In some embodiments, IT data is preexisting/static and can be provided to building management system 102 as a batch. However, it is contemplated that IT data can be updated after it has been created if changes occur to the entities or relationships described by the IT data.

As used herein, the term "static" refers to data, characteristics, attributes, or other information that does not change over time or change infrequently. For example, a device name or address may be referred to as a static characteristic of the device because it does not change frequently. However, should be understood that "static" items are not limited to permanently fixed information. Some types of static items may change occasionally or infrequently. For example, a device address may be a type of static attribute that can be changed if desired but is not expected to change frequently. Static data is contrasted with dynamic data that is expected to change relatively frequently.

OT data may include any type of data related to operational technology in or around a building. Operational technology may include, for example, hardware and/or software dedicated to detecting or causing changes in physical processes through direct monitoring and/or control of physical devices such as valves, pumps, etc. Operational technology may include the use of computers to monitor or alter the physical state of a system, such as the control system for a building or the control network for the building. Examples of operational technology include programmable logic controllers (PLCs), supervisory control and data acquisition (SCADA) systems, distributed control systems, computer numerical control (CNC) systems including computerized machine tools, and scientific equipment.

OT data may include data that is generated and/or updated in real-time as a result of operating the systems and devices that provide data to building management system 102. For example, OT data may include timeseries data received from IoT devices 203 (e.g., sensor measurements, status indications, alerts, notifications, etc.), weather information received from weather service 152, a news feed received from news service 154, document updates received from document service 156, media updates received from media service 158, and/or other types of telemetry data. In general, OT data can be described as real-time operational data or streaming data whereas IT data can be described as institutional or contextual data that is not continuously updated. For example, the OT data associated with a particular sensor may include measurements from the sensor, whereas the IT data associated with the sensor may include the sensor name, sensor type, and sensor location. OT data may change relatively frequently (e.g., each time a new measurement is recorded by a sensor) whereas IT data may remain static or change relatively less frequently (e.g., when the sensor is renamed or moved to a new location).

Building management system 102 can process and transform/translate the OT data and IT data using platform services 220 to generate timeseries data and entity data. Throughout this disclosure, the term "raw timeseries data" is used to describe the raw data samples of OT data received by building management system 102. The term "derived timeseries data" is used to describe the result or output of a transformation or other timeseries processing operation performed by platform services 220 (e.g., data aggregation, data cleansing, virtual point calculation, etc.). The raw timeseries data and derived timeseries data can be provided to various applications 230 and/or stored in timeseries storage 214 (e.g., as materialized views of the raw timeseries data). The term "entity data" is used to describe the attributes of various entities (e.g., people, spaces, things, etc.) and relationships between entities. The entity data can be created by platform services 220 as a result of processing the IT data and/or OT data received by building management system 102 and can be stored in entity storage 216.

Before discussing building management system 102 in greater detail, it should be noted that the components of building management system 102 can be integrated within a single device (e.g., a web server, a supervisory controller, a building controller, etc.) or distributed across multiple separate systems or devices. For example, the components of building management system 102 can be implemented as part of a cloud computing platform configured to receive and process data from multiple buildings and IoT devices. In other embodiments, the components of building management system 102 can be implemented as part of a building automation system installed within a building or as part of a suite of cloud-hosted services. In other embodiments, some or all of the components of building management system 102 can be components of a subsystem level controller (e.g., a HVAC controller), a subplant controller, a device controller (e.g., an AHU controller, a chiller controller, etc.), a field controller, a computer workstation, a client device, or any other system or device that receives and processes data from building equipment.

Still referring to FIG. 2, building management system 102 is shown to include a communications interface 204. Communications interface 204 can include wired or wireless communications interfaces (e.g., jacks, antennas, transmitters, receivers, transceivers, wire terminals, etc.) for conducting data communications with building systems 202, IoT devices 203, weather service 152, news service 154, document service 156, media service 158, or other external systems or devices. Communications conducted via communications interface 204 can be direct (e.g., local wired or wireless communications) or via a communications network 104 (e.g., a WAN, the Internet, a cellular network, etc.).

Communications interface 204 can facilitate communications between building management system 102 and external applications (e.g., remote systems and applications) for allowing user control, monitoring, and adjustment to building management system 102 and/or the devices that communicate with building management system 102. Communications interface 204 can also facilitate communications between building management system 102 and client devices (e.g., computer workstations, laptop computers, tablets, mobile devices, etc.). Building management system 102 can be configured to communicate with external systems and devices using any of a variety of communications protocols (e.g., HTTP(S), WebSocket, CoAP, MQTT, etc.) building automation systems protocols (e.g., BACnet, Modbus, LonWork, C-Bus, KNZ, DALI, ADX, etc.), industrial control protocols (e.g., MTConnect, OPC, OPC-UA, etc.), process automation protocols (e.g., HART, Profibus, etc.), home automation protocols, or any of a variety of other protocols. Advantageously, building management system 102 can receive, ingest, and process data from any type of system or device regardless of the communications protocol used by the system or device.

Building management system 102 is shown to include a processing circuit 206 including a processor 208 and memory 210. Processor 208 can be a general purpose or specific purpose processor, an application specific integrated circuit (ASIC), one or more field programmable gate arrays (FPGAs), a group of processing components, or other suitable processing components. Processor 208 is configured to execute computer code or instructions stored in memory 210 or received from other computer readable media (e.g., CDROM, network storage, a remote server, etc.).

Memory 210 can include one or more devices (e.g., memory units, memory devices, storage devices, etc.) for storing data and/or computer code for completing and/or facilitating the various processes described in the present disclosure. Memory 210 can include random access memory (RAM), read-only memory (ROM), hard drive storage, temporary storage, non-volatile memory, flash memory, optical memory, or any other suitable memory for storing software objects and/or computer instructions. Memory 210 can include database components, object code components, script components, or any other type of information structure for supporting the various activities and information structures described in the present disclosure. Memory 210 can be communicably connected to processor 208 via processing circuit 206 and can include computer code for executing (e.g., by processor 208) one or more processes described herein. When processor 208 executes instructions stored in memory 210, processor 208 generally configures processing circuit 206 to complete such activities.

In some embodiments, building management system 102 includes a plurality of processors, memories, interfaces, and other components distributed across multiple devices or systems. For example, in a cloud-based or distributed implementation, building management system 102 may include multiple discrete computing devices, each of which includes a processor 208, memory 210, communications interface 204, software defined gateway 212, and/or other components of building management system 102. Tasks performed by building management system 102 can be distributed across multiple systems or devices, which may be located within the building or facility or distributed across multiple buildings or facilities. In some embodiments, multiple software defined gateways 212 are implemented using different processors, computing devices, servers, and/or other components and carry out portions of the features described herein.

Still referring to FIG. 2, building management system 102 is shown to include a software defined gateway 212. Software defined gateway 212 may be implemented as a component of a software defined networking (SDN) network. SDN is a network architecture that is dynamic, manageable, cost-effective, and adaptable, making it suitable for high-bandwidth and dynamic applications. SDN architectures decouple network control and forwarding functions, enabling network control to become directly programmable and the underlying infrastructure to be abstracted from applications and network services. In some instances, SDN technology facilitates network management and enables programmatically efficient network configuration in order to improve network performance and monitoring. SDN architectures provide a more flexible approach to networking in contrast to the static architecture of traditional networks. For example, traditional networks can be decentralized and complex while current networks require more flexibility and easy troubleshooting. SDN suggests to centralize network intelligence in one network component by disassociating the forwarding process of network packets (i.e., the data plane) from the routing process (i.e., control plane). The control plane may include one or more controllers which are considered as the brain of SDN network where the whole intelligence is incorporated. As a component of SDN, software defined gateway 212 may be flexible enough to be dynamically updated by SDN so that its configuration can be rewritten as needed by pushing a new configuration to software defined gateway 212.

Software defined gateway 212 can receive the IT data and OT data via communications interface 204 and can provide translated IT data and OT data to platform services 220, timeseries storage 214, and/or entity storage 216. For example, software defined gateway 212 can be configured to translate the incoming IT data and OT data from a protocol or format used by the data sources into a protocol or format used by platform services 220. In some embodiments, the OT data include timestamps and data values for various data points. The data values can be measured or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. Software defined gateway 212 can receive data samples from multiple different devices.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to building management system 102. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, software defined gateway 212 adds timestamps to the data samples based on the times at which the data samples are received. Software defined gateway 212 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by software defined gateway 212 is as follows: [<key, $timestamp_1$, $value_1$>, <key, $timestamp_2$, $value_2$>, <key, $timestamp_3$, $value_3$>]
where key is an identifier of the source of the raw data samples (e.g., timeseries ID, sensor ID, etc.), $timestamp_i$ identifies the time at which the ith sample was collected, and $value_i$ indicates the value of the ith sample.

Software defined gateway 212 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, software defined gateway 212 organizes the raw timeseries data. Software defined gateway 212 can identify a system or device associated with each of the data points. For example, software defined gateway 212 can associate a data point with a temperature sensor, an air handler, a chiller, or any other type of system or device. In various embodiments, data collector uses the name of the data point, a range of values of the data point, statistical characteristics of the data point, or other attributes of the data point to identify a particular system or device associated with the data point. Software defined gateway 212 can then determine how that system or device relates to the other systems or devices in the building site. For example, software defined gateway 212 can determine that the identified system or device is part of a larger system (e.g., a HVAC system) or serves a particular space (e.g., a particular building, a room or zone of the building, etc.). In some embodiments, software defined gateway 212 uses or creates an entity graph when organizing the timeseries data. An example of such an entity graph is described in greater detail with reference to FIGS. 12 and 14 and in U.S. patent application Ser. No. 15/644,560 filed Jul. 7, 2017, the entire disclosure of which is incorporated by reference herein.

In some embodiments, software defined gateway 212 uses the IT data and OT data to update the attributes of various entities. As described above, an entity is a virtual representation (e.g., a data object) of a person, space, system, device, or thing that provides data to building management system 102. For example, a conference room entity may be a virtual representation of a physical conference room space within a building. The conference room entity may include a variety of attributes that describe the conference room. For example, the conference room may include a "location" attribute that describes where the conference room is located, a "contains" attribute that identifies one or more systems or devices of equipment contained within the conference room, a "contained within" attribute that identifies a floor or building that contains the conference room, a "temperature" attribute that indicates the current air temperature of the conference room, an "occupancy" attribute that indicates whether the conference room is occupied or unoccupied, or any of a variety of other attributes. Software defined gateway 212 can use the OT data to update the values of the attributes of various entities each time a new data sample or event is received. Similarly, software defined gateway 212 can use the IT data to update the values of the attributes of various entities when the relationships between entities or other attributes indicated by the IT data changes. In other embodiments, entity attributes are updated by entity service 226 of platform services 220.

Software defined gateway 212 can provide the timeseries data and entity data to platform services 220 and/or store the timeseries data and entity data in timeseries storage 214 and entity storage 216, respectively. In some embodiments, timeseries storage 214 and entity storage 216 can be data storage internal to building management system 102 (e.g., within memory 210) or other on-site data storage local to the building site or other location at which the IT data and OT data are collected. In other embodiments, timeseries storage 214 and entity storage 216 can include a remote database, cloud-based data hosting, or other remote data storage. For example, timeseries storage 214 and entity storage 216 can include remote data storage located off-site relative to the building site or other location at which the IT data and OT data are collected. Timeseries storage 214 can be configured to store the raw timeseries data obtained by software defined gateway 212, the derived timeseries data generated by platform services 220, and/or directed acyclic graphs (DAGs) used by platform services 220 to process the timeseries data. Similarly, entity storage 216 can be configured to store the IT data and OT data collected by software defined gateway 212 and/or the entity data generated by platform services 220.

Still referring to FIG. 2, BMS 102 is shown to include platform services 220. Platform services 220 can receive the translated IT data and OT data from software defined gateway 212 and/or retrieve the timeseries data and entity data from timeseries storage 214 and entity storage 216. Platform services 220 can include a variety of services configured to analyze, process, and transform the IT data and OT data to create timeseries data and entity data. For example, platform services 220 are shown to include a security service 222, an analytics service 224, an entity service 226, and a timeseries service 228. Security service 222 can assign security attributes to the IT data and OT data to ensure that the IT data and OT data are only accessible to authorized individuals, systems, or applications.

Analytics service 224 can use the translated IT data and OT data as inputs to various analytics (e.g., fault detection, energy consumption, web traffic, revenue, etc.) to derive an analytic result from the IT data and OT data. Analytics service 224 can apply a set of fault detection rules to the IT data and OT data to determine whether a fault is detected at each interval of a timeseries. Fault detections can be stored as derived timeseries data. For example, analytics service 224 can generate a new fault detection timeseries with data values that indicate whether a fault was detected at each interval of the timeseries. An example of such a fault detection timeseries is described in greater detail in U.S. patent application Ser. No. 15/644,560. The fault detection timeseries can be stored as derived timeseries data along with the raw timeseries data in timeseries storage 214.

Entity service 226 can use the translated IT data and OT data provided by software defined gateway 212 to create or update the attributes of various entities managed by building management system 102. Some entity attributes may be the most recent value of a data point provided to building management system 102 as OT data. For example, the "temperature" attribute of a conference room entity may be the most recent value of a temperature data point provided by a temperature sensor located in the conference room. Entity service 226 can use the IT data to identify the temperature sensor located in the conference room and can use the OT data associated with the identified temperature sensor to update the "temperature" attribute each time a new sample of the temperature data point is received. As another example, a "most recent view" attribute of a webpage entity may indicate the most recent time at which the webpage was viewed. Entity service 226 can use the OT data from a click tracking system or web server to determine when the most recent view occurred and can update the "most recent view" attribute accordingly.

Other entity attributes may be the result of an analytic, transformation, calculation, or other processing operation based on the OT data and IT data. For example, entity service 226 can use the IT data to identify an access control device (e.g., a card reader, a keypad, etc.) at the entrance/exit of a building space. Entity service 226 can use OT data received from the identified access control device to track the number of occupants entering and exiting the building space. Entity service 226 can update a "number of occupants" attribute of an entity representing the building space each time a person enters or exits the building space such that the "number of occupants" attribute reflects the current number of occupants within the space. As another example, a "total revenue" attribute associated with a product line entity may be the summation of all the revenue generated from sales of the corresponding product. Entity service 226 can use the OT data received from a sales tracking system (e.g., a point of sale system, an accounting database, etc.) to determine when a sale of the product occurs and identify the amount of revenue generated by the sale. Entity service 226 can then update the "total revenue" attribute by adding the most recent sales revenue to the previous value of the attribute.

In some embodiments, entity service 226 uses IT data and/or OT data from multiple different data sources to update the attributes of various entities. For example, an entity representing a person may include a "risk" attribute that quantifies the person's level of risk attributable to various physical, environmental, or other conditions. Entity service 226 can use OT data from a card reader or IT data from a human resources system to determine the physical location of the person at any given time. Entity service 226 can use weather data from weather service 152 to determine whether any severe weather is approaching the person's location. Similarly, entity service 226 can use emergency data from news service 154 or media service 158 to determine whether the person's location is experiencing any emergency conditions (e.g., active shooter, police response, fire response, etc.). Entity service 226 can use building data from building systems 202 to determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Entity service 226 can use these and other types of data as inputs to a risk function that calculates the value of the person's "risk" attribute and can update the person entity accordingly.

Still referring to FIG. 2, timeseries service 228 can apply various transformations, operations, or other functions to the raw timeseries data provided by software defined gateway 212 to generate derived timeseries data. In some embodiments, timeseries service 228 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 228 provide an efficient mechanism for applications 230 to query the timeseries data. For example, applications 230 can construct visualizations of the timeseries data (e.g., charts, graphs, etc.) using the pre-aggregated data rollups instead of the raw timeseries data. This allows applications 230 to simply retrieve and present the pre-aggregated data rollups without requiring applications 230 to perform an aggregation in response to the query. Since the data rollups are pre-aggregated, applications 230 can present the data rollups quickly and efficiently without requiring additional processing at query time to generate aggregated timeseries values.

In some embodiments, timeseries service 228 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 228 can calculate a virtual data point ($pointID_3$) by adding two or more actual data points ($pointID_1$ and $pointID_2$) (e.g., $pointID_3 = pointID_1 + pointID_2$). As another example, timeseries service 228 can calculate an enthalpy data point ($pointID_4$) based on a measured temperature data point ($pointID_2$) and a measured pressure data point ($pointID_6$) (e.g., $pointID_4 = \text{enthalpy}(pointID_2, pointID_6)$). The virtual data points can be stored as derived timeseries data.

Applications 230 can access and use the virtual data points in the same manner as the actual data points. Applications 230 do not need to know whether a data point is an actual data point or a virtual data point since both types of data points can be stored as derived timeseries data and can be handled in the same manner by applications 230. In some embodiments, the derived timeseries are stored with attributes designating each data point as either a virtual data point or an actual data point. Such attributes allow applications 230 to identify whether a given timeseries represents a virtual data point or an actual data point, even though both types of data points can be handled in the same manner by applications 230. These and other features of timeseries service 228 are described in greater detail in U.S. patent application Ser. No. 15/644,560 filed Jul. 7, 2017, the entire disclosure of which is incorporated by reference herein.

Still referring to FIG. 2, building management system 102 is shown to include several applications 230 including an energy management application 232, monitoring and reporting applications 234, and enterprise control applications 236. Although only a few applications 230 are shown, it is contemplated that applications 230 can include any of a variety of applications configured to use the derived timeseries generated by platform services 220. In some embodiments, applications 230 exist as a separate layer of building management system 102 (i.e., separate from platform services 220 and software defined gateway 212). This allows applications 230 to be isolated from the details of how the IT data and OT data are collected and how the timeseries data and entity data are generated. In other embodiments, applications 230 can exist as remote applications that run on remote systems or devices (e.g., remote systems and applications, client devices, etc.).

Applications 230 can use the derived timeseries data to perform a variety data visualization, monitoring, and/or control activities. For example, energy management application 232 and monitoring and reporting application 234 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point. Several examples of user interfaces that can be generated based on the derived timeseries data are described in U.S. patent application Ser. No. 15/182,579 filed Jun. 14, 2016, and U.S. Provisional Patent Application No. 62/446,284 filed Jan. 13, 2017. The entire disclosures of both these patent applications are incorporated by reference herein.

Enterprise control application 236 can use the derived timeseries data to perform various control activities. For example, enterprise control application 236 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, a deep learning or reinforcement learning algorithm, an artificial intelligence (AI) based control algorithm, etc.) to generate control signals for building systems 202. In some embodiments, building systems 202 use the control signals to operate building equipment. Operating the building equipment can affect the measured or calculated values of the data samples provided to building management system 102. Accordingly, enterprise control application 236 can use the derived timeseries data as feedback to control the systems and devices of building systems 202.

Software Defined Gateway

Figure 3:
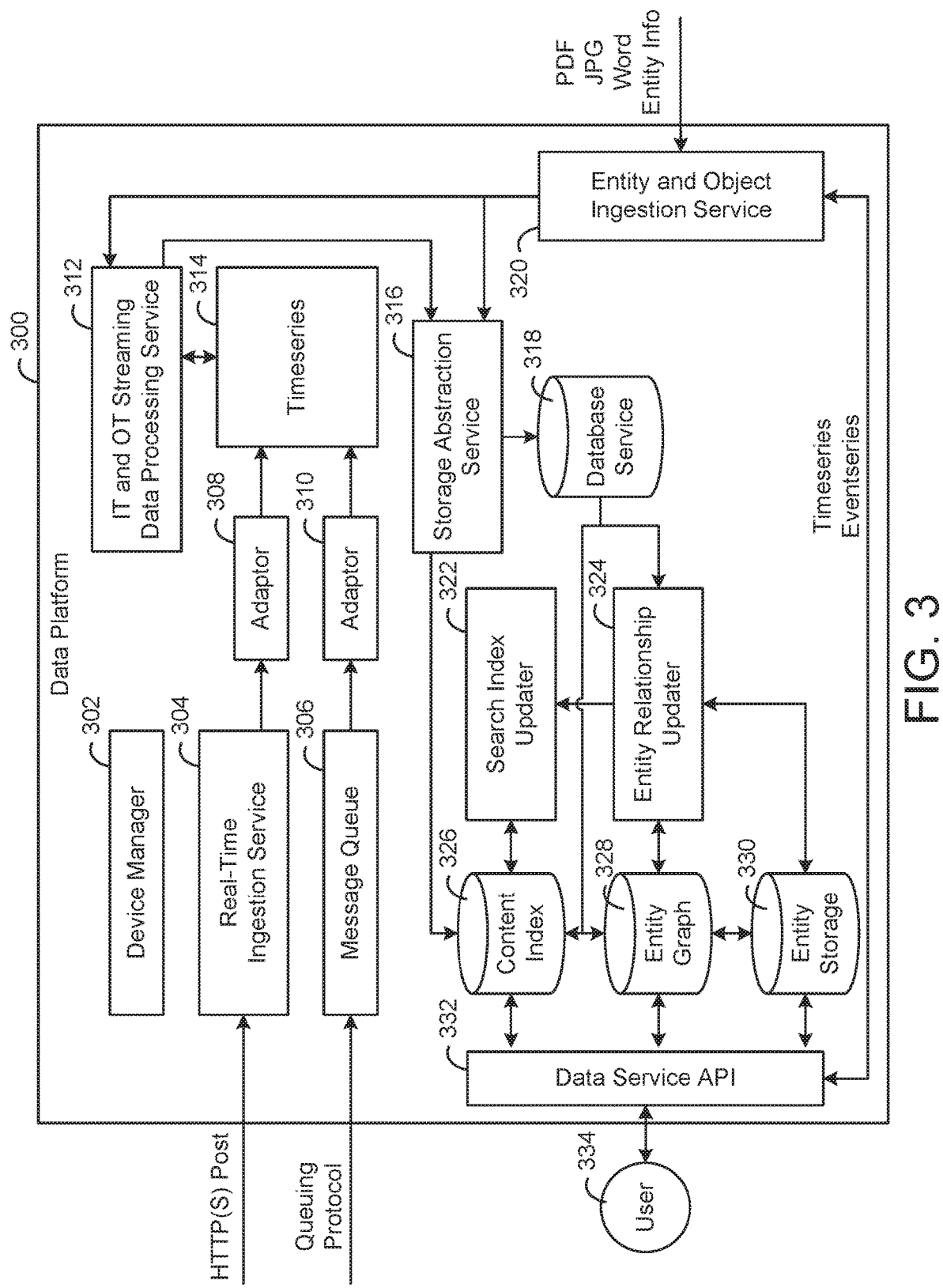
FIG. 3 is a block diagram illustrating a data platform that receives data from the software defined gateway of FIG. 2, according to some embodiments.
Figure 4:
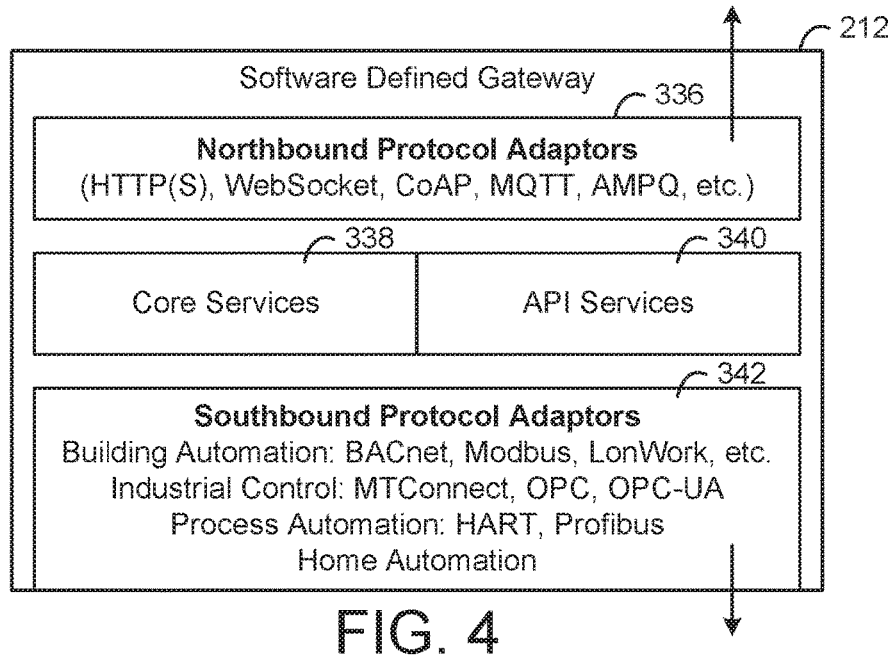
FIG. 4 is a block diagram illustrating the software defined gateway of FIG. 2 in greater detail, according to some embodiments.
Figure 5:
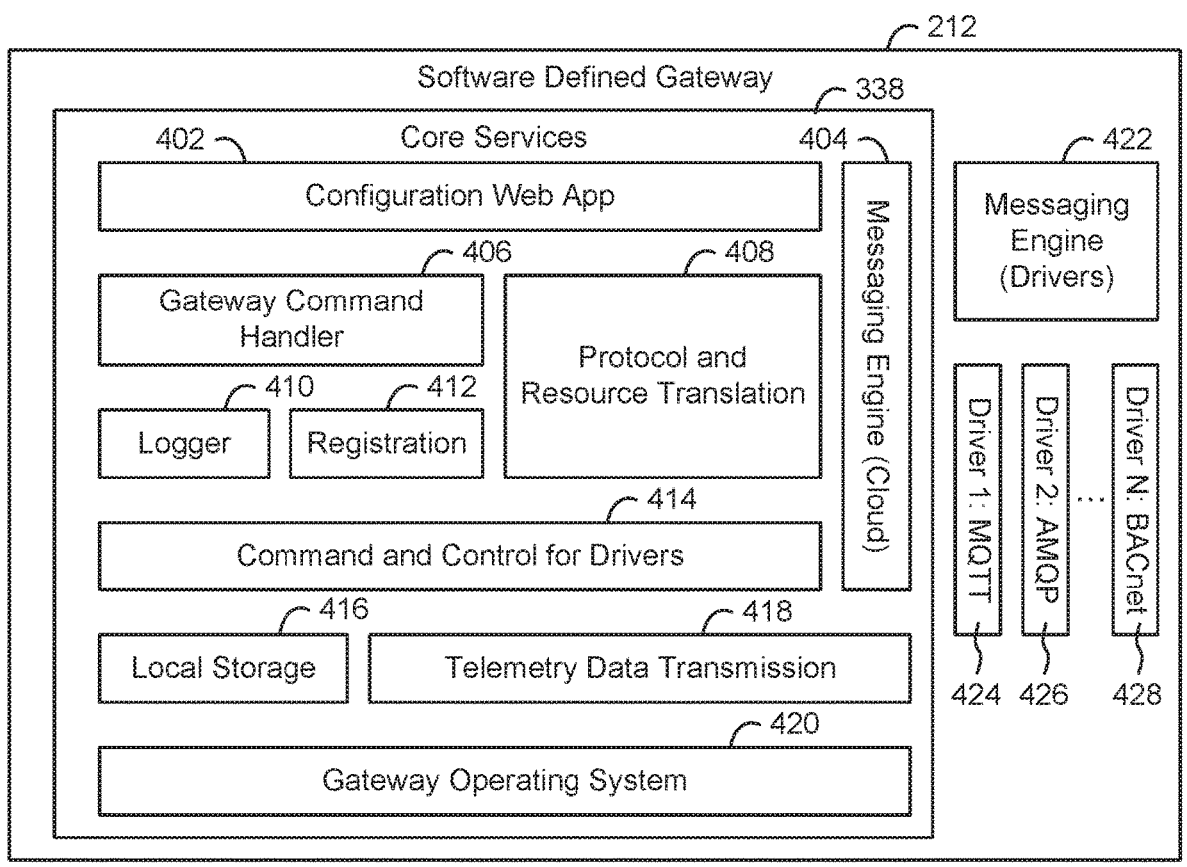
FIG. 5 is another block diagram illustrating the software defined gateway of FIG. 2 in greater detail, according to some embodiments.

Referring now to FIGS. 3-5, block diagrams illustrating software defined gateway 212 in greater detail and a data platform 300 that receives data from software defined gateway 212 are shown, according to an exemplary embodiment. Unlike a traditional hardware gateway, software defined gateway 212 may be implemented entirely as software components. Software defined gateway 212 may be responsible for collecting data from sensors, building equipment, IoT devices, and other external systems and devices, as previously described. Software defined gateway 212 can store the collected data until the data can be processed by platform services 220 and sent to applications 230 via a target data transmission protocol.

In some embodiments, software defined gateway 212 includes software intelligent data transmission algorithms to decide if the data at a given stage of processing should be temporary, persistent, or kept in-memory. Intelligent data transmission can be used for optimizing data transmission cost when cellular network services are used. In some embodiments, software defined gateway 212 is fault tolerant and has disaster recovery. For example, software defined gateway 212 can be configured to compensate for a power outage or network connection loss that may result in an interruption of gateway processing. Software defined gateway 212 can be bootstrapped and started automatically as soon as power returns or network connection restores to the device, and can resume work from the point at which it was interrupted. Software defined gateway 212 can be configured to handle system logging and can balance the number of log entries stored on by software defined gateway 212 with the number of log entries sent for external storage.

Referring specifically to FIG. 3, data platform 300 is shown. Data platform 300 can be configured to receive data from software defined gateway 212 and is shown to include a device manager 302. Device manager 302 can be configured to identify smart connected devices that send data to building management system 102. In some embodiments, device manager 302 identifies smart connected devices via a token sent by the smart connected devices and/or via any other login credential. For example, the token may be an encrypted key that device manager 302 can decrypt. Based on the identity of a device of the smart connected devices, device manager 302 may allow the device to retrieve data and/or software stored by building management system 102. Device manager 302 can be further configured to generate control signals for smart connected devices and/or otherwise control the functionality of smart connected devices. In some embodiments, device manager 302 is configured to perform manifest updating and/or software updating. For example, device manager 302 can be configured to store a manifest for smart connected devices and/or store software files. In this regard, device manager 302 can store and/or retrieve data (e.g., a manifest) and can update the manifest and/or software.

In some embodiments, device manager 302 manages virtual representations of various devices that communicate with building management system 102. The virtual representations may be a type of smart entity (e.g., "digital twins" or "shadows") that represent physical devices and can be stored in entity storage 330. The smart entities may track various information regarding the physical devices that they represent. In some embodiments, device manager 302 is configured to update the smart entities when new IT data or OT data that affects the smart entities are received. For example, the smart entities may include a "Chiller A" entity that represents a physical chiller and a "Conference Room D" entity that represents a space within a building. In response to incoming IT data that indicates Chiller A serves Conference Room D, device manager 302 may update the Chiller A entity to include a "serves" relationship that identifies Conference Room D. Similarly, in response to receiving a new sample of OT data from Chiller A (e.g., a new measurement of chilled water temperature), device manager 302 may update an "Average Chilled Water Temperature" attribute of the Chiller A entity to reflect a new average that includes the most recent sample of OT data. Several examples of these and other functions which can be performed by device manager 302 are described in detail in U.S. patent application Ser. No. 15/494,403 filed Apr. 21, 2017, and U.S. patent application Ser. No. 15/639,880 filed Jun. 30, 2017, both of which are incorporated by reference herein in their entireties.

Still referring to FIG. 3, data platform 300 is shown to include a real-time ingestion service 304 and a message queue 306. Real-time ingestion service 304 can be configured to receive and handle HTTP(S) posts and other types of real-time data, whereas message queue 306 can be configured to receive and handle messages received via a queuing protocol. In some embodiments, the data received via real-time ingestion service 304 and message queue 306 includes timeseries data and other types of OT data collected by software defined gateway 212 in real-time. For example, real-time ingestion service 304 can be configured to receive and handle measurements obtained from sensors or other types of building equipment in real-time. Message queue 306 can be configured to receive and handle messages generated by building equipment and/or by a user device. Adaptors 308 and 310 can translate the data received via real-time ingestion service 304 and message queue 306 and store the data as timeseries 314. In some embodiments, IT and OT streaming data processing service 312 interacts with timeseries 314 to process the IT data, OT data, and/or other types of data used to generate timeseries 314.

Data platform 300 is shown to include an entity and object ingestion service 320. Entity and object ingestion service 320 can be configured to receive and handle incoming IT data. For example, entity and object ingestion service 320 can be configured to receive PDF data, image data (e.g., JPG, PNG, BMP, etc.), video data, word data, entity information, and/or other types of IT data, as previously described. Entity and object ingestion service 320 can provide the IT data to IT and OT streaming data processing service 312 for further processing and/or to storage abstraction service 316. Storage abstraction service 316 can be configured to store the processed IT and OT data using database service 318. Storage abstraction service 316 can also create and store an index of the processed IT and OT data in content index 326.

Search index updater 322 can use the index information stored in content index 326 to update a search index for the IT and OT data. Entity relationship updater 324 can be configured to determine whether the IT data defines new entity relationships by comparing the IT data with entity graph 328. If new entity relationships are detected, entity relationship updater 324 can update the entity relationships in entity graph 328. Entity relationship updater 324 can also store updated entity information in entity storage 330. Data service API 332 can be configured to interface with content index 326, entity graph 328, and entity storage 330 to allow the indexed content, entity graph, and entities to be viewed, queried, retrieved, or otherwise presented to a user 334 or other external system, device, or service. Data service API 332 can also interface with entity and object ingestion service 320 to access timeseries data and eventseries data. Several examples of such timeseries and eventseries data are described in detail in U.S. patent application Ser. No. 15/644,560 filed Jul. 7, 2017, the entire disclosure of which is incorporated by reference herein.

Referring now to FIG. 4, software defined gateway 212 is shown to include northbound protocol adaptors 336, southbound protocol adaptors 342, core services 338, and API services 340. Southbound protocol adaptors 342 may be responsible for the discovery of connected subsystems including sensors and actuators and for collecting data. Southbound protocol adaptors 342 can be configured to communicate and translate data using building automation systems protocols (e.g., BACnet, Modbus, LonWork, C-Bus, KNZ, DALI, ADX, etc.), industrial control protocols (e.g., MTConnect, OPC, OPC-UA, etc.), process automation protocols (e.g., HART, Profibus, etc.), home automation protocols, or any of a variety of other protocols.

In some embodiments, southbound protocol adaptors 342 are configured to communicate and translate data received by software defined gateway 212 in the BACnet communications protocol. BACnet is a communications protocol for building automation and control networks and may be used by a variety of building equipment and other devices in building management system 102. The BACnet protocol defines a variety of different standard object types as well as standard attributes of the defined object types.

The BACnet southbound protocol adaptor can be configured to identify the object type specified by a BACnet data message and extract attributes from the BACnet data message. The BACnet southbound protocol adaptor can translate the extracted attributes from the BACnet protocol into a common format used to store the data values in building management system 102. Similarly, the BACnet southbound protocol adaptor can translate stored data within building management system 102 into a BACnet data message and can send the BACnet data message to a connected BACnet device.

In some embodiments, southbound protocol adaptors 342 are configured to communicate and translate data received by software defined gateway 212 in the Modbus communications protocol. Modbus is a serial communications protocol that is often used by building equipment and other industrial electronic devices. Modbus enables communication among many devices connected to the same network. For example, building management system 102 may include sensors that measure temperature and humidity and communicate the measurements to a controller or other supervisory device. Modbus can be used to connect a supervisory computer or controller with a remote terminal unit (RTU) in building management system 102 and other types of supervisory control systems.

In some embodiments, each device intended to communicate using Modbus is given a unique address. In some Modbus networks, only the node assigned as the Master may initiate a command. On Ethernet, any device can send out a Modbus command, although usually only one master device does so. A Modbus command can contain the Modbus address of the device for which the command is intended (e.g., address 1 to 247). Only the intended device will act on the command, even though other devices might receive it. Modbus commands can instruct a device to change the value in one of its registers, control or read an I/O port, and command the device to send back one or more values contained in its registers.

The Modbus southbound protocol adaptor can be configured to parse Modbus commands and identify the device for which each command is intended. The Modbus southbound protocol adaptor can translate the command and/or device identifier into a standard format used by building management system 102. Similarly, the Modbus southbound protocol adaptor can translate stored data within building management system 102 into a Modbus data message and can send the Modbus data message to a connected Modbus device.

In some embodiments, southbound protocol adaptors 342 are configured to communicate and translate data received by software defined gateway 212 in the LonWorks communications protocol. LonWorks is a networking platform specifically created to address the needs of control applications. LonWorks is used in a variety of industries including building, home, street lighting, transportation, utility, and industrial automation. Products and applications built on top of the LonWorks platform may include embedded machine control, municipal and highway/tunnel/street lighting, heating and air conditioning systems, intelligent electricity metering, subway train control, building lighting, stadium lighting and speaker control, security systems, fire detection and suppression, and newborn location monitoring and alarming, and remote power generation load control.

The communications protocol by the LonWorks platform is known as LonTalk. The LonWorks southbound protocol adaptor can be configured to parse LonTalk formatted messages and extract the data content from the messages. The LonWorks southbound protocol adaptor can translate the LonTalk formatted data into a standard format used by building management system 102. Similarly, the LonWorks southbound protocol adaptor can translate stored data within building management system 102 into a LonTalk data message and can send the LonTalk data message to a connected LonWorks device.

In some embodiments, southbound protocol adaptors 342 are configured to connect non-IP and LAN-based IP devices and collect data (e.g., pulling data from legacy devices). For example, southbound protocol adaptors 342 can be configured to identify a messaging protocol or format used by legacy devices and can map the data content of such messages into a standard format used by building management system 102. Southbound protocol adaptors 342 can populate the attributes of a smart entity using the data received from legacy devices in order to fully integrate such legacy devices with building management system 102.

Southbound protocol adaptors 342 may include plug-in software architecture plays to provide extensibility. Each of southbound protocol adaptors 342 can provide a set of common operations and data models, which allows a software defined gateway 212 to communicate and exchange data with a variety of different types of devices that use different communication protocols. In some embodiments, southbound protocol adaptors 342 include protocol drivers that provide various common operation interfaces via APIs or inter-process communication. For example, southbound protocol adaptors 342 can manage driver processes including start, stop, restart and kill driver processes. Southbound protocol adaptors 342 manage diver configuration data including passing initial configuration data to the driver process, as well as reconfiguration requests. Southbound protocol adaptors 342 can request sub-system discovery, request data reading and subscription of specific data points, and can request driver performance and status information.

In some embodiments, southbound protocol adaptors 342 include a host process that manages protocol drivers responsible for posting collected data to core services 338. This allows software defined gateway 212 to optimize the data aggregation, enrichment and transmission at a given stage of processing (e.g., be temporary, persistent, or kept in-memory) and computational constraints. Core services 338 can perform appropriate message aggregation, enrichment, transformation, and transmission to allow building management system 102 to store and process the collected data. API services 340 can be configured to interface with other systems, devices, and processes to allow interaction with core services 338 and other components of software defined gateway 212.

Northbound protocol adaptors 336 can be configured to communicate and translate data using various other protocols (e.g., HTTP(S), Web Socket, CoAP, MQTT, etc.) to allow building management system 102 to interact with systems and devices using such communications protocols. In some embodiments, northbound protocol adaptors 336 are responsible for sending data to cloud services via a standard protocol such as HTTP(S), AMQP and/or MQTT.

Figures 6, 7:
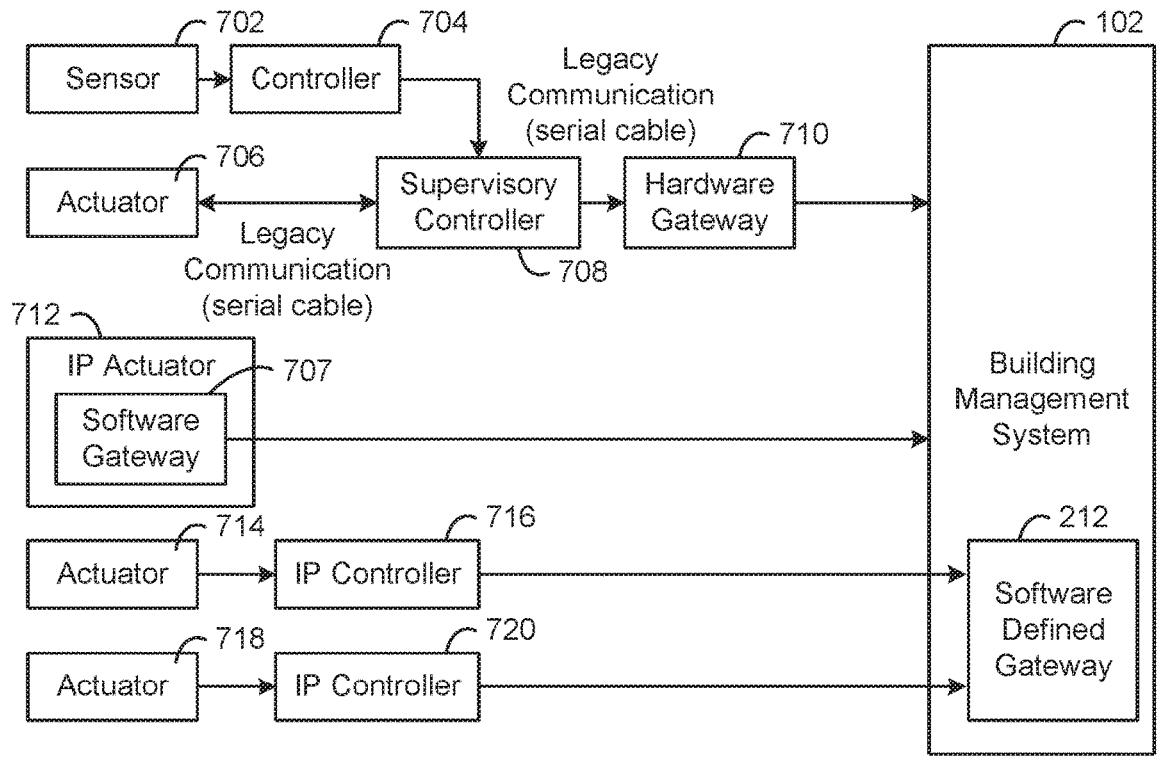
FIG. 6 is an image of a user interface which can be generated by the software defined gateway of FIG. 2, according to some embodiments.
FIG. 7 is a block diagram illustrating several gateway deployment topologies, according to some embodiments.

Referring now to FIG. 5, core services 338 are shown to include a configuration web application 402. Configuration web application 402 may be a web-based application that allows for configuration of software defined gateway 212. Configuration web application 402 may allow a user to view, set, or adjust the network configuration for both WAN and LAN, drivers, users, trending or telemetry data setup. An example of an interface 600 which can be generated and presented by configuration web application 402 is shown in FIG. 6.

Gateway command handler 406 can be configured to provide an interface that allows a remote user or application to perform gateway management and unified driver management operations. For example, gateway command handler 406 allows an operator to update gateway software remotely, modify or create configuration through a unified gateway and connected device management console. A management console can use gateway command handler 406 to manage many connected gateway devices. Logger 410 can be configured to perform system logging for performance optimization and diagnostics purposes. Registration 412 can be configured to register and provision software defined gateway 212 as a connected IoT device.

Protocol and resource translation 408 can be configured to expose legacy data points (i.e., a resource) as a trend to the platform services 220. Protocol and resource translation 408 can also expose legacy data points to be updated from remote mobile applications and make such points accessible from internet protocols (e.g., a resource in RESTful protocol). Accordingly, protocol and resource translation 408 can provide a mechanism to create a virtual resource accessible via IoT service and to perform real-time semantic mediation between a legacy system's resource and a corresponding virtual resource while maintaining uniform semantics. For example, a temperature reading from a legacy BACnet device is typically not accessible via the internet. However, protocol and resource translation 408 can create a virtual resource (e.g., a RESTful endpoint) and make it available to IoT services and applications. This could be a simple mapping table or complex translation service. Several examples of semantic mediation and protocol translation operations which can be performed by protocol and resource translator 408 are described in detail in U.S. Pat. No. 8,516,016 granted Aug. 20, 2013, and U.S. Pat. No. 9,189,527 granted Nov. 17, 2015, both of which are incorporated by reference herein in their entireties.

Command and control for drivers 414 can be configured to facilitate communication between IoT services and legacy systems through a series of abstraction layers and services. Such command and control abstraction provides uniform management capabilities among various protocol adapters (or called protocol drivers). Command and control for drivers 414 can provide a set of instructions including start, stop, restart, and kill driver process. Command and control for drivers 414 can provide notifications of driver configuration (e.g., IP address of BACnet device) to driver process to allow a driver to update its operating configuration. Command and control for drivers 414 can also perform sub-system discovery requests, on-demand data reading from the legacy device, and inquiries of driver performance and status.

Core services 338 is shown to include two distinct messaging engines 404 and 322. Messaging engine 404 can be configured to provide messaging between software defined gateway 212 and a cloud service, whereas messaging engine 422 can be configured to provide messaging between software defined gateway 212 and various driver plug-ins (e.g., an MQTT driver 424, a AMQP driver 426, a BACnet driver 428, etc.). Messaging engine 422 is more closely related to inter-process communication among gateway core services 338 and protocol drivers 424-428. Messaging engine 414 can be implemented with inter-process communication techniques including pipe, message queue, and shared memory. Messaging engine 422 can be implemented with a standard IoT messaging protocols (e.g., MQTT, AMQP, HTTP(S), etc.).

Local storage 416 can be configured to store data locally within core services 338. Telemetry data transmission 418 can be configured to transmit data to remote systems and devices for remote storage. Gateway operating system 420 provides an operating environment in which the other components, services, and modules of software defined gateway 212 operate.

Gateway Deployment Topology

Referring now to FIG. 7, a block diagram illustrating several different gateway deployment topologies is shown. A gateway is not just a pass-through proxy device that forwards data from sensors or other devices to services. Sending all the information collected by devices to backend services would be highly ineffective in terms of performance and network utilization. An IoT gateway can perform certain pre-processing of information close to a data source before they're sent to the cloud service. Examples of pre-processing include message filtering, simple pattern detection, and aggregation.

FIG. 7 shows three types of gateway deployments: a hardware gateway 710, a software gateway 707, and a software defined gateway 212. Hardware gateway 710 is implemented as a hardware device installed on site (i.e., at the building site) with the equipment that sends data to gateway 710. For example, sensor 702 sends measurements to controller 704. Controller 704 and actuator 706 communicate with a supervisory controller 708 using legacy communication (e.g., a serial cable). Supervisory controller 708 communicates with hardware gateway 710, which sends data to building management system 102.

Software gateway 707 is embedded into an IP-enabled device such as an IP actuator 712. IP actuator 712 uses a software gateway development SDK to make registration, provisioning, and telemetry of the embedded software gateway 707. In some embodiments, the SDK comes with common runtimes to make an IP device IoT gateway compliant. Software gateway 707 can be deployed as a virtual machine or as a containerized software component.

Software defined gateway 212 can be implemented in the cloud as a software only option that uses legacy IP communication protocols such as BACnet over IP via VPN tunneling. Alternatively, software defined gateway 212 can be implemented at the customer site with the equipment that sends data to gateway 212. Software defined gateway 212 can perform protocol and message translation between legacy IP protocols and IoT messaging protocols. In addition, software defined gateway 212 can perform registration and provisioning of a legacy IP device into cloud services.

Gateway Software Update

Figure 8A:
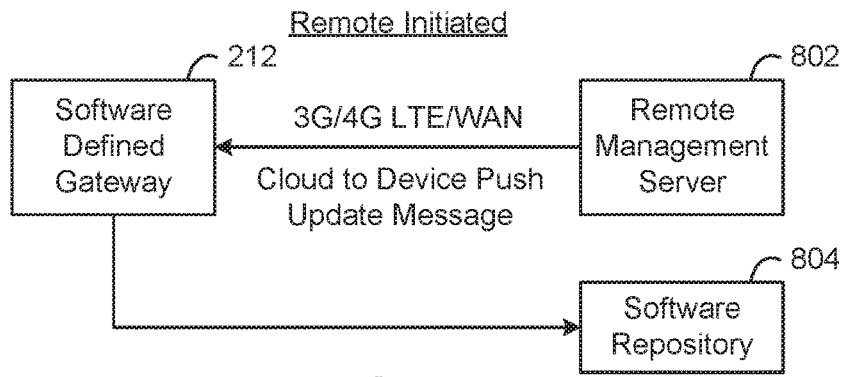
FIG. 8A is a block diagram illustrating a remote initiated gateway update process, according to some embodiments.
Figure 8B:
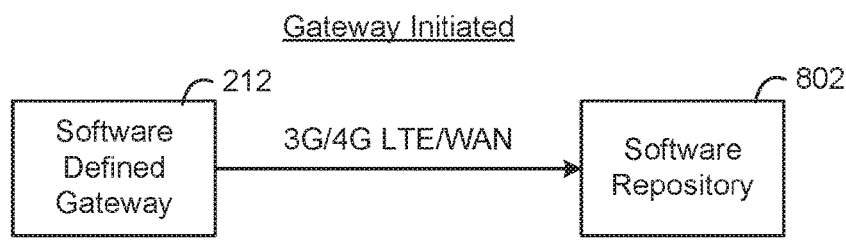
FIG. 8B is a block diagram illustrating a remote initiated gateway update process, according to some embodiments.
Figure 9:
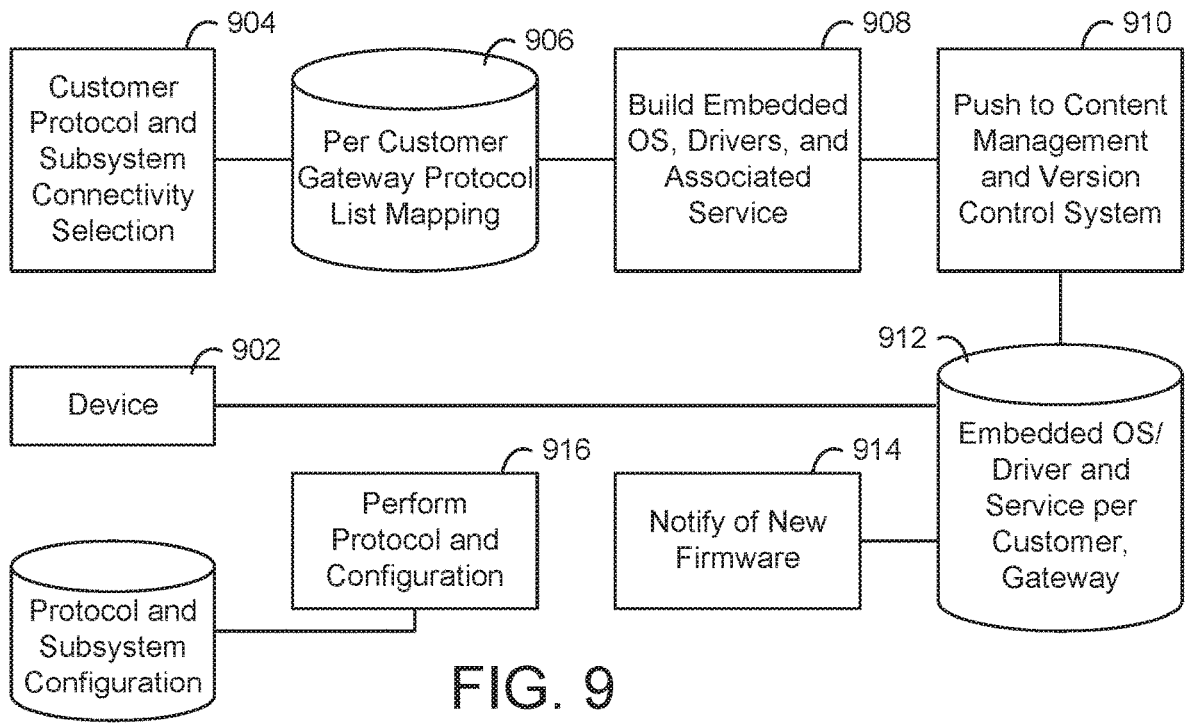
FIG. 9 is a block diagram illustrating another gateway update process, according to some embodiments.

Referring now to FIGS. 8A-9, block diagrams illustrating several techniques for updating the software of gateway 212 are shown, according to various exemplary embodiments. It may be desirable to update the software of gateway 212. After the development of the gateway software onto a device and delivery to the field, the ability to maintain and update gateway software may be limited. Accordingly, the ability to download software updates over-the-air is particularly advantageous from a security and a maintenance perspective, as it can minimize the delivery time of critical security fixes.

FIG. 8A illustrates a remote-initiated technique for updating the software of gateway 212. In this approach, a remote management server 802 pushes the proper version of the software to gateway 212. For example, remote management server 802 may send a notification to gateway 212 that a new software version is available. This requires update push action from remote management server 802. Gateway 212 can then connect to and retrieve the latest version of the gateway software from a software repository 804.

FIG. 8B illustrates a gateway-initiated technique for updating the software of gateway 212. In this approach, gateway 212 is responsible for connecting to software repository 804 and comparing the version of software installed on gateway 212 with the version of software available at software repository 804. If there is an update, gateway 212 can automatically download the latest version of the software. A software update monitoring agent can be installed in gateway 212 to communicate with remote management server 802 and/or software repository 804. This is the most scalable approach because it doesn't require any centralized coordination of the deployment action.

FIG. 9 illustrates a technique that can be used when not all protocol and/or subsystem connectivity protocols can be deployed in a single gateway software package. Some of the system connectivity protocols may require a larger server class machine to deploy. In this technique, a device identifies an embedded operating system/driver and service per customer gateway (step 902). The customer protocol and subsystem connectivity is selected (step 904) and the per customer gateway protocol list mapping is generated (step 906). Embedded operating system/drivers, and associated services are built (step 908) and published to a content management and version control system (step 910). The embedded operating system/driver and service per customer gateway is stored in a database (step 912) and the device is notified that there is new firmware (step 914). The protocol and subsystem configuration is then used to perform protocol and configuration (step 916).

Integration With Enterprise Applications

Figure 10:
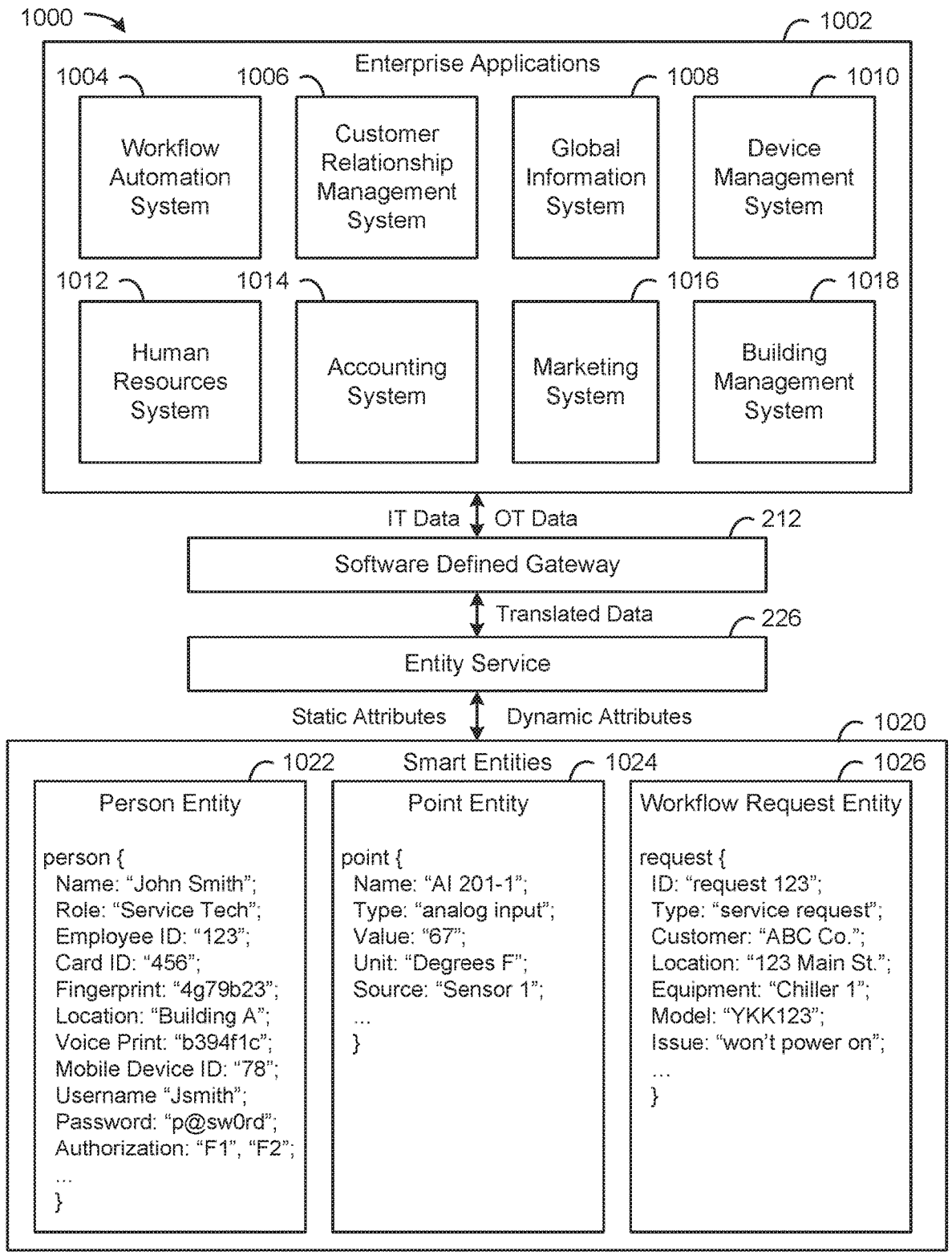
FIG. 10 is a block diagram of a system for integrating smart entities with enterprise applications, according to some embodiments.

Referring now to FIG. 10, a block diagram of a system 1000 is shown, according to an exemplary embodiment. System 1000 is shown to include enterprise applications 1002, software defined gateway 212, entity service 226, and smart entities 1020. As described above, software defined gateway 212 can be configured to receive IT data and OT data from a plurality of different data sources, translate the incoming IT data and OT data into a format or protocol used by building management system 102, and provide the translated IT data and OT data to entity service 226. In some embodiments, the data sources include various enterprise applications 1002 such as a workflow automation system 1004, a customer relationship management (CRM) system 1006, a global information system (GIS) 1008, a device management system 1010, a human resource system 1012, an accounting system 1014, a marketing system 1016, and/or a building management system 1018.

The IT data received from enterprise applications 1002 may include data that describes various entities (e.g., people, spaces, devices, etc.) and the relationships therebetween. For example, IT data from building management system 1018 may include an entity graph that describes the relationships between spaces, equipment, and other entities (e.g., chiller A provides chilled fluid to air handling unit B, air handling unit B provides airflow to room C, temperature sensor D located in room C, person E part of employee team F, floor G contains room C, etc.). IT data from human resource system 1012 may include data that describes a set of employees and includes details about the employees (e.g., name, employee ID, job title/role, responsibilities, payroll information, address, etc.). IT data from device management system 1010 may include device information data that various IoT devices that communicate with building management system 102.

Entity service 226 can use the incoming IT data to generate values for various static attributes of smart entities 1020. For example, entity service can use IT data from human resources system 1012 to populate and/or generate values for the static attributes of person entity 1022. The static attributes may describe a particular person that person entity 1022 represents. For example, the static attributes of person entity 1022 are shown to include a name attribute (e.g., "John Smith"), a role attribute (e.g., "Service Tech"), an employee ID attribute (e.g., "123"), a card ID attribute (e.g., "456"), and a plurality of other attributes that describe the static characteristics of a particular person. As another example, entity service can use IT data from device management system 1010 or building management system 1018 to populate and/or generate values for the static attributes of point entity 1024. The static attributes may describe a particular point in building management system 1018 (e.g., a temperature point). For example, the static attributes of point entity 1024 are shown to include a point name attribute (e.g., "AI 201-1"), a point type (e.g., "analog input"), a unit of measure (e.g., "Degrees F."), and a data source (e.g., "Sensor 1").

In some embodiments, the IT data received from enterprise applications 1002 include workflow requests. For example, workflow automation system 1004 can receive a request from a customer indicating that a particular piece of equipment requires service. Workflow automation system 1004 can create a work order based on the customer request and provide the work order to building management system 102 via software defined gateway 212. Entity service 226 can translate the incoming work order into a workflow request entity 1026 that includes a plurality of attributes that describe the work order. For example, workflow request entity 1026 is shown to include an ID attribute uniquely identifying the request (i.e., "request 123"), a type attribute that indicates the type of request (e.g., "service request"), a customer attribute indicating a customer associated with the request (e.g., "ABC Co."), a location attribute indicating a location at which service is requested (e.g., "123 Main St."), an equipment attribute identifying the equipment requiring service (e.g., "Chiller 1"), a model attribute identifying a model number of the equipment requiring service (e.g., "YKK123"), and an issue attribute indicating why the equipment requires service (e.g., "won't power on").

The OT data received from enterprise applications 1002 may include data that is generated and/or updated in real-time as a result of operating the systems and devices that provide data to building management system 102. For example, OT data may include timeseries data received from device management system 1010 or building management system 1018 (e.g., sensor measurements, status indications, alerts, notifications, etc.), weather information received from weather service 152, a news feed received from news service 154, document updates received from document service 156, media updates received from media service 158, and/or other types of telemetry data. In general, OT data can be described as real-time operational data or streaming data whereas IT data can be described as institutional or contextual data that is not continuously updated. For example, the OT data associated with a particular sensor may include measurements from the sensor, whereas the IT data associated with the sensor may include the sensor name, sensor type, and sensor location.

Entity service 226 can use the incoming OT data to derive or generate values for one or more dynamic attributes of smart entities 1020. For example, the "Location" attribute of person entity 1022 may indicate the current location of the person represented by person entity 1022. Entity service 226 can use the incoming OT data from building management system 1018 to determine the current location of the person and can update the location attribute of person entity 1022 accordingly. Similarly, the "Value" attribute of point entity 1024 may indicate the current value of the temperature point represented by point entity 1024. Entity service 226 can use the incoming OT data from building management system 1018 to determine the current value of the temperature point (e.g., "67") and can update the value attribute of point entity 1024 accordingly.

As shown in FIG. 10, the integration of enterprise applications 1002 with smart entities 1020 is bidirectional. In the inbound direction, incoming IT data and OT data from enterprise applications 1002 can be ingested by software defined gateway 212 and converted into static and dynamic attributes of smart entities 1020 by entity service 226. In the outbound direction, the attributes of smart entities 1020 can be read by entity service 226 and translated into IT data and OT data by software defined gateway 212. In some embodiments, software defined gateway 212 translates the outbound IT data and OT data into a protocol or format used by enterprise applications 1002. The translated IT data and OT data can then be provided to enterprise applications 1002 for use in performing an activity or process managed by enterprise applications 1002 (e.g., building management, device management, customer management, personnel management, etc.).

Smart Entities and Entity Service

Figure 11:
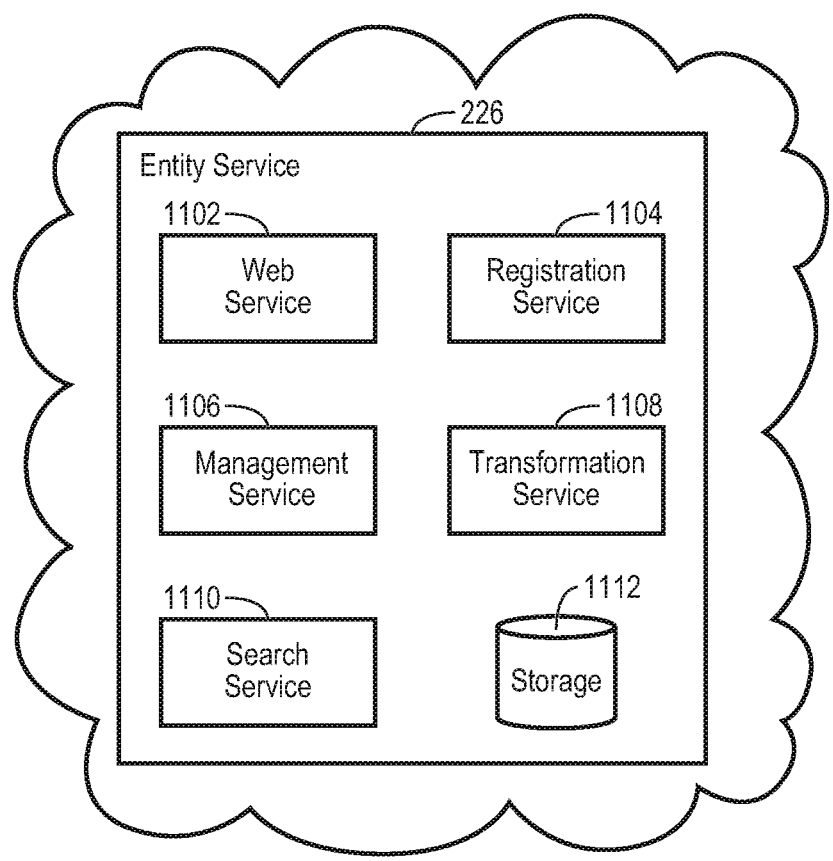
FIG. 11 is a block diagram illustrating an entity service of FIG. 2 in greater detail, according to some embodiments.

Referring now to FIG. 11, a block diagram illustrating entity service 226 in greater detail is shown, according to some embodiments. Entity service 226 registers and manages various buildings (e.g., 110-140), spaces, persons, subsystems, devices (e.g., devices 112-146), and/or other entities in building management system 102. According to various embodiments, an entity may be any person, place, or physical object, hereafter referred to as an object entity. Further, an entity may be any event, data point, or record structure, hereinafter referred to as data entity. In addition, an object may define a relationship between entities, hereinafter referred to as a relational object.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 226 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is analyzed, inferred, calculated, or determined based on data from a plurality of data sources.

In some embodiments, the relational object may be defined as having at least a static attribute. The static attribute of the relational object may semantically define the type of relationship between two or more entities. For example, in a non-limiting embodiment, a relational object for a relationship that semantically defines that Entity A has a part of Entity B, or that Entity B is a part of Entity A may include:
hasPart{Entity A, Entity B}
where the static attribute hasPart defines what the relationship is of the listed entities, and the order of the listed entities or data field of the relational object specifies which entity is the part of the other (e.g., Entity A→hasPart→Entity B).

In various embodiments, the relational object is an object-oriented construct with predefined fields that define the relationship between two or more entities, regardless of the type of entities. For example, BMS 102 can provide a rich set of pre-built entity models with standardized relational objects that can be used to describe how any two or more entities are semantically related, as well as how data is exchanged and/or processed between the entities. Accordingly, a global change to a definition or relationship of a relational object at the system level can be effected at the object level, without having to manually change the entity relationships for each object or entity individually. Further, in some embodiments, a global change at the system level can be propagated through to third-party applications integrated with BMS 102 such that the global change can be implemented across all of the third-party applications without requiring manual implementation of the change in each disparate application.

Figure 12:
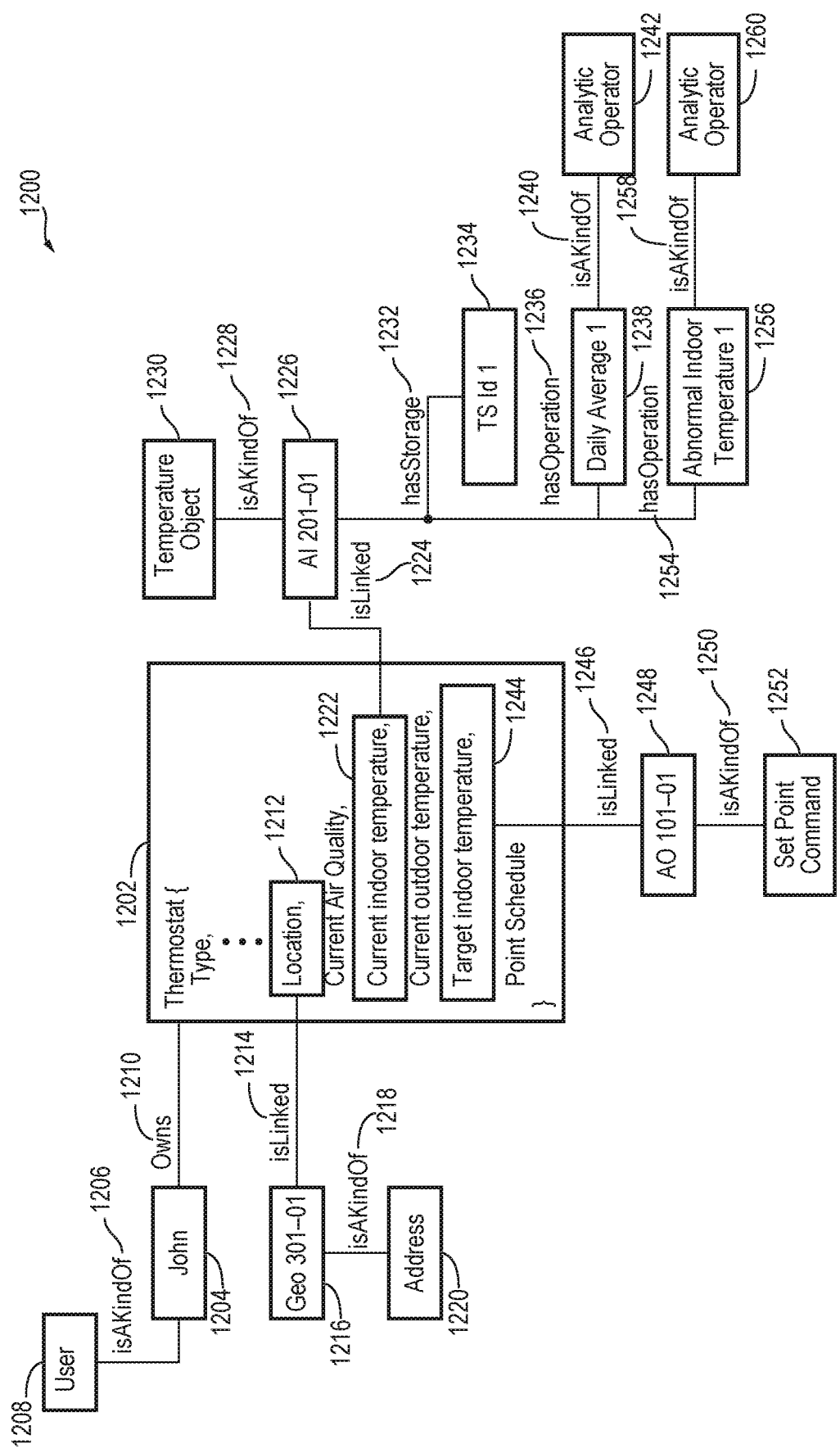
FIG. 12 in an example entity graph of entity data, according to some embodiments.

For example, referring to FIG. 12, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational objects that semantically define the relationships between the enti-ties. The relational objects may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

```
Thermostat{
    Type,
    Model No,
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}
``` where various attributes are static attributes (e.g., "Type," "Model Number," "Device Name," etc.,), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.,), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, a BMS, building subsystem, or device may need data from a plurality of sources as well as information on how the sources relate to each other in order to provide a proper decision, action, or recommendation. Accordingly, in various embodiments, the entity data further includes the relational objects to semantically define the relationships between the entities, which may help to increase speeds in analyzing data, as well as provide ease of navigation and browsing.

For example, still referring to FIG. 12, an entity graph 1200 for the thermostat object entity 1202 includes various class entities (e.g., User, Address, SetPoint Command, and Temperature Object), relational objects (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational objects describe the relationships between the various class, object, and data entities in a semantic and syntactic manner, so that an application or user viewing the entity graph 1200 can quickly determine the relationships and data process flow of the thermostat object entity 1202, without having to resort to a data base analyst or engineer to create, index, and/or manage the entities (e.g., using SQL or NoSQL).

For example, the entity graph 1200 shows that a person named John (object entity) 1204 isAKindOf (relational object) 1206 user (class entity) 1208. John 1204 owns (relational object) 1210 the thermostat 1202. The thermostat 1202 has a location attribute (dynamic attribute) 1212 that isLinked (relational object) 1214 to Geo 301-01 (data entity) 1216, which isAKindOf (relational object) 1218 an address (class entity) 1220. Accordingly, Geo 301-01 1216 should have a data point corresponding to an address.

The thermostat 1202 further includes a "current indoor temperature" attribute (dynamic attribute) 1222 that isLinked (relational object) 1224 to AI 201-01 (data entity) 1226. AI 201-01 1226 isAKindOf (relational object) 1228 temperature object (class entity) 1230. Thus, AI 201-01 1226 should contain some sort of temperature related data. AI 201-01 1226 hasStorage (relational object) 1232 at TS ID 1 (data entity) 1234, which may be raw or derived timeseries data for the temperature readings. AI 201-01 1226 hasOperation (relational object) 1236 of Daily Average 1 (data entity) 1238, which isAKindOf (relational object) 1240 Analytic Operator (class entity) 1242. Thus, Daily Average 1 results from an analytic operation that calculates the daily average of the indoor temperature. AI 201-01 1226 further hasOperation (relational object) 1254 of Abnormal Indoor Temperature (data entity) 1256, which isAKindOf (relational object) 1258 Analytic Operator (class entity) 1260. Accordingly, Abnormal Indoor Temperature results from an analytic operation to determine an abnormal temperature (e.g., exceeds or falls below a threshold value).

In this example, the data entity AI 201-01 1226 may be represented by the following data model:

```
point {
    name: "AI 201-01";
    type: "analog input";
    value: 72;
    unit: "Degree-F.";
    source: "Temperature Sensor 1"
}
``` where "point" is an example of a data entity that may be created by BMS 102 to hold the value for the linked "Current indoor temperature" 1222 dynamic attribute of the Thermostat entity 1202, and source is the sensor or device in the Thermostat device that provides the data to the linked "Current indoor temperature" 1222 dynamic attribute.

The data entity TS Id 1 1234 may be represented, for example, by the following data model:

```
timeseries {
    name: "TS Id 1";
    type: "Daily Average";
    values: "[68, 20666, 70, 69, 71];
    unit: "Degree-F.";
    point: "AI 201-01";
    source: "Daily Average 1"
}
``` where the data entity Daily Average 1 1238 represents a specific analytic operator used to create the data entity for the average daily timeseries TS Id 1 1234 based on the values of the corresponding data entity for point AI 201-01 1226. The relational object hasOperation shows that the AI 201-01 data entity 1226 is used as an input to the specific logic/math operation represented by Daily Average 1 1238. TS Id 1 1234 might also include an attribute that identifies the analytic operator Daily Average 1 1238 as the source of the data samples in the timeseries.

Still referring to FIG. 12, the entity graph 1200 for thermostat 1202 shows that the "target indoor temperature" attribute (dynamic attribute) 1244 isLinked (relational attribute) 1246 to the data entity AO 101-01 (data entity) 1248. AO 101-01 data entity 1248 isAKindOf (relational attribute) 1250 SetPoint Command (class entity) 1252. Thus, the data in data entity AO 101-01 1248 may be set via a command by the user or other entity, and may be used to control the thermostat object entity 1202. Accordingly, in various embodiments, entity graph 1200 provides a user friendly view of the various relationships between the entities and data processing flow, which provides for ease of navigation, browsing, and analysis of data.

Referring again to FIG. 11, entity service 226 may transform raw data samples and/or raw timeseries data into data corresponding to entity data. For example, as discussed above with reference to FIG. 12, entity service 226 can create data entities that use and/or represent data points in the timeseries data. Entity service 226 includes a web service 1102, a registration service 1104, a management service 1106, a transformation service 1108, a search service 1110, and storage 1112. In some embodiments, storage 1112 may be internal storage or external storage. For example, storage 1112 may be entity storage 216 (see FIG. 2), internal storage with relation to entity service 226, and/or may include a remote database, cloud-based data hosting, or other remote data storage.

Web service 1102 can be configured to interact with web-based applications to send entity data and/or receive raw data (e.g., data samples, timeseries data, and the like). For example, web service 1102 can provide an interface (e.g., API, UI/UX, and the like) to manage (e.g., register, create, edit, delete, and/or update) an entity (e.g., class entity, object entity, data entity, relational object, and/or the like). In some embodiments, web service 1102 provides entity data to web-based applications. For example, if one or more of applications 230 are web-based applications, web service 1102 can provide entity data to the web-based applications.

In some embodiments, web service 1102 receives raw data samples and/or raw timeseries data including device information from a web-based data collector, or a web-based security service to identify authorized entities and to exchange secured messages. For example, if software defined gateway 212 is a web-based application, web service 1102 can receive the raw data samples and/or timeseries data including a device attribute indicating a type of device (e.g., IoT device) from which the data samples and/or timeseries data are received from software defined gateway 212. In some embodiments, web service 1102 may message security service 222 to request authorization information and/or permission information of a particular user, building, BMS, building subsystem, device, application, or other entity. In some embodiments, the entity service 226 processes and transforms the collected data to generate the entity data.

Registration service 1104 can perform registration of devices and entities. For example, registration service 1104 can communicate with building subsystems and client devices (e.g., via web service 1102) to register each entity (e.g., building, BMS, building subsystems, devices, and the like) with BMS 102. In some embodiments, registration service 1104 registers a particular building subsystem (or the devices therein) with a specific user and/or a specific set of permissions and/or entitlements. For example, a user may register a device key and/or a device ID associated with the device via a web portal (e.g., web service 1102). In some embodiments, the device ID and the device key may be unique to the device. The device ID may be a unique number associated with the device such as a unique alphanumeric string, a serial number of the device, and/or any other static identifier.

In various embodiments, the device is provisioned by a manufacturer and/or any other entity. In various embodiments, the device key and/or device ID are saved to the device or building subsystem based on whether the device includes a trusted platform module (TPM). If the device includes a TPM, the device or building subsystem may store the device key and/or device ID according to the protocols of the TPM. If the device does not include a TPM, the device or building subsystem may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 1104 (e.g., an IoT hub such as AZURE® IoT Hub). In some embodiments, registration service 1104 is configured to store the device key and the device ID in secure permanent storage and/or may be stored by security service 222 (e.g., by a security API). In some embodiments, a manufacturer and/or any other individual may register the device key and the device ID with registration service 1104 (e.g., via web service 1102). In various embodiments, the device key and the device ID are linked to a particular profile associated with the building subsystem or device and/or a particular user profile (e.g., a particular user). In this regard, a device (or building subsystem) can be associated with a particular user. In various embodiments, the device key and the device ID make up the profile for device. The profile may be registered as a device that has been manufactured and/or provisioned but has not yet been purchased by an end user.

In various embodiments, registration service 1104 adds and/or updates a device in an building hub device registry. In various embodiments, registration service 1104 may determine if the device is already registered, can set various authentication values (e.g., device ID, device key), and can update the building hub device registry. In a similar manner, registration service 1104 can update a document database with the various device registration information.

In some embodiments, registration service 1104 can be configured to create a virtual representation (e.g., "digital twins" or "shadow records") of each object entity (e.g., person, room, building subsystem, device, and the like) in the building within BMS 102. In some embodiments, the virtual representations are smart entities that include attributes defining or characterizing the corresponding object and are associated to the corresponding object entity via relational objects defining the relationship of the object and the smart entity representation thereof.

In some embodiments, the virtual representations maintain shadow copies of the object entities with versioning information so that entity service 226 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational object (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

Management service 1106 may create, modify, or update various attributes, data entities, and/or relational objects of the objects managed by entity service 226 for each entity rather than per class or type of entity. This allows for separate processing/analytics for each individual entity rather than only to a class or type of entity. Some attributes (or data entities) may correspond to, for example, the most recent value of a data point provided to BMS 102 via the raw data samples and/or timeseries data. For example, the "current indoor temperature" dynamic attribute 1222 of the "thermostat" object entity 1202 in the example discussed above may be the most recent value of indoor temperature provided by the thermostat device. Management service 1106 can use the relational objects of the entity data for thermostat 1202 to determine where to update the data of the attribute.

For example, management service 1106 may determine that a data entity (e.g., AI 201-01) is linked to the "current indoor temperature" dynamic attribute of thermostat 1202 via an isLinked relational object. In this case, management service 1106 may automatically update the attribute data in the linked data entity. Further, if a linked data entity does not exist, management service 1106 can create a data entity (e.g., AI 201-01) and an instance of the isLinked relational object 1224 to store and link the "current indoor temperature" dynamic attribute of thermostat 1202 therein. Accordingly, processing/analytics for thermostat 1202 may be automated. As another example, a "most recent view" attribute (or linked data entity) of a webpage object entity may indicate the most recent time at which the webpage was viewed. Management service 1106 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, management service 1106 can use the relational objects in entity data to identify a related access control device (e.g., a card reader, a keypad, etc.) at the entrance/exit of a building object entity. Management service 1106 can use raw data received from the identified access control device to track the number of occupants entering and exiting the building object entity (e.g., via related card entities used by the occupants to enter and exit the building). Management service 1106 can update a "number of occupants" attribute (or corresponding data entity) of the building object each time a person enters or exits the building using a related card entity, such that the "number of occupants" attribute (or data entity) reflects the current number of occupants within the building object.

As another example, a "total revenue" attribute associated with a product line object may be the summation of all the revenue generated from related point of sales entities. Management service 1106 can use the raw data received from the related point of sales entities to determine when a sale of the product occurs, and can identify the amount of revenue generated by the sales. Management service 1106 can then update the "total revenue" attribute (or related data entity) of the product line object by adding the most recent sales revenue from each of the related point of sales entities to the previous value of the attribute.

In some embodiments, management service 1106 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 1106 can use relational objects of the person object entity to identify a related card device and/or a related card reader from a related building object entity (e.g., the building in which the person works) to determine the physical location of the person at any given time. Management service 1106 can use weather data from a weather service in the region in which the building object entity is located to determine whether any severe weather is approaching the person's location. Similarly, management service 1106 can use building data from related building entities of the building object entity to determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 1106 can use these and other types of data as inputs to a risk function that calculates the value of the person object's "risk" attribute and can update the person object (or related device entity of the person object) accordingly.

In some embodiments, management service 1106 can be configured to synchronize configuration settings, parameters, and other device-specific or object-specific information between the entities and BMS 102. In some embodiments, the synchronization occurs asynchronously. Management service 1106 can be configured to manage device properties dynamically. The device properties, configuration settings, parameters, and other device-specific information can be synchronized between the smart entities created by and stored within BMS 102.

In some embodiments, management service 1106 is configured to manage a manifest for each of the building subsystems (or devices therein). The manifest may include a set of relationships between the building subsystems and various entities. Further, the manifest may indicate a set of entitlements for the building subsystems and/or entitlements of the various entities and/or other entities. The set of entitlements may allow BMS 102, building subsystem, and/or a user to perform certain actions within the building or (e.g., control, configure, monitor, and/or the like).

Still referring to FIG. 11, transformation service 1108 can provide data virtualization, and can transform various pre-defined standard data models for entities in a same class or type to have the same entity data structure, regardless of the object, device, or thing that the entity represents. For example, each object entity under an object class may include a location attribute, regardless of whether or not the location attribute is used. Thus, if an application is later developed requiring that each object entity includes a location attribute, manual mapping of heterogenous data of different entities in the same class may be avoided. Accordingly, interoperability and scalability of applications may be improved.

In some embodiments, transformation service 1108 can provide entity matching, cleansing, and correlation so that a unified cleansed view of the entity data including the entity related information (e.g., relational objects) can be provided. Transformation service 1108 can support semantic and syntactic relationship description in the form of standardized relational objects between the various entities. This may simplify machine learning because the relational objects themselves provide all the relationship description between the other entities. Accordingly, the rich set of pre-built entity models and standardized relational objects may provide for rapid application development and data analytics.

Figure 13:
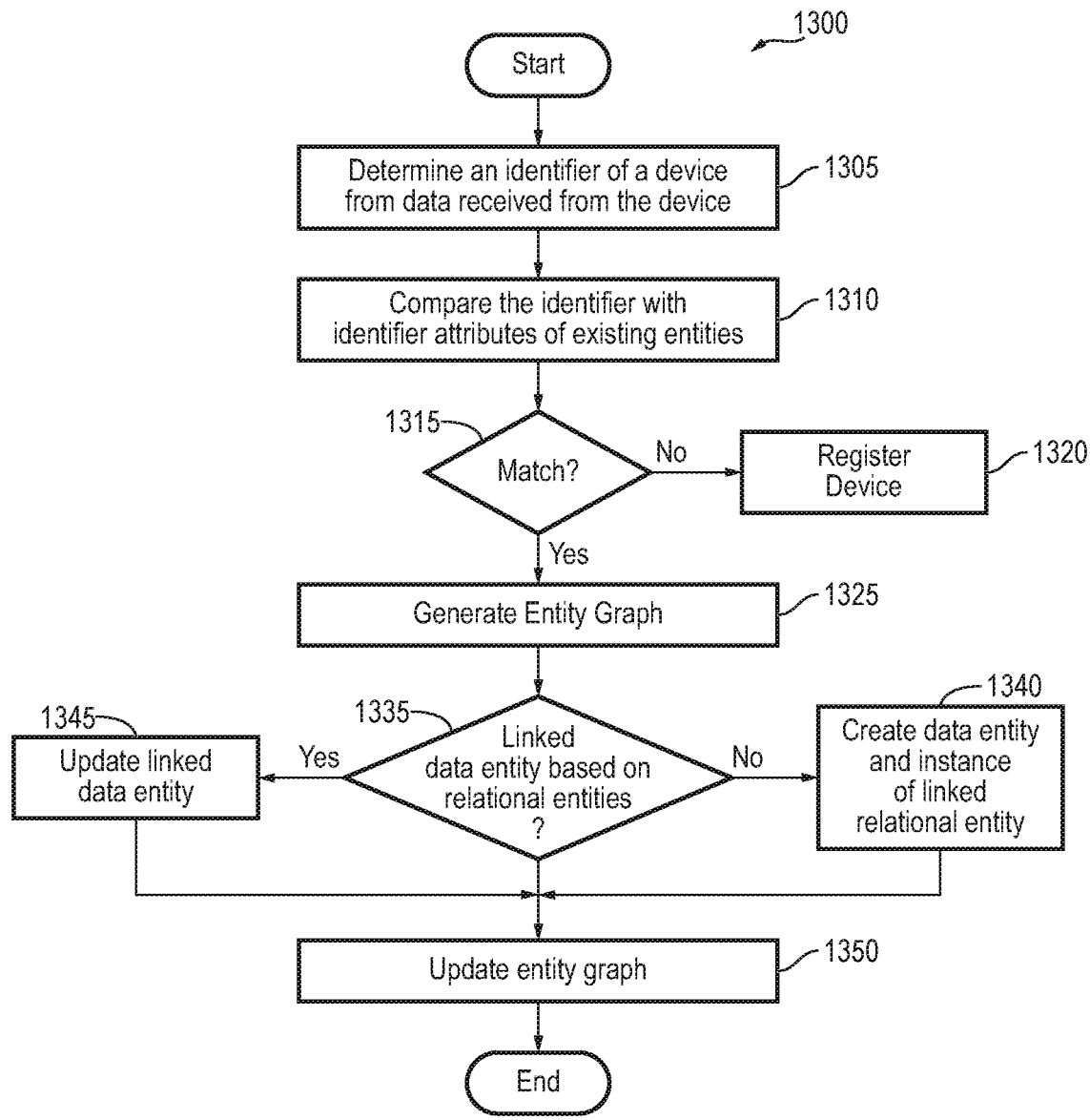
FIG. 13 is a flow diagram of a process or method for updating/creating an attribute of a related entity based on data received from a device, according to some embodiments.

For example, FIG. 13 shows a flow diagram of a process 1300 for updating or creating a data entity based on data received from a device of a building subsystem, according to some embodiments. Referring to FIG. 13, process 1300 starts, and when raw data and/or timeseries data is received from a device of a building subsystem, transformation service 1108 may determine an identifier of the device from the received data at block 1305. At block 1310, transformation service 1108 may compare an identity static attribute from the data with identity static attributes of registered object entities to locate a data container for the device. If a match does not exist from the comparison at block 1315, transformation service 1108 may invoke registration service to register the device at block 1320. If a match exists from the comparison at block 1315, transformation service 1108 may generate an entity graph or retrieve entity data for the device at block 1325.

From the entity graph or entity data, transformation service 1108 may determine if a corresponding data entity exists based on the relational objects (e.g., isLinked) for the device to update a dynamic attribute from the data at block 1335. If not, management service 1106 may create a data entity for the dynamic attribute and an instance of a corresponding relational object (e.g., isLinked) to define the relationship between the dynamic attribute and created data entity at block 1340. If the corresponding data entity exists, management service 1106 may update the data entity corresponding to the dynamic attribute from the data at block 1345. Then, transformation service 1108 may update or regenerate the entity graph or entity data at block 1350, and process 1300 may end.

Referring again to FIG. 11, search service 1110 provides a unified view of product related information in the form of the entity graph, which correlates entity relationships (via relational descriptors) among multiple data sources (e.g., CRM, ERP, MRP and the like). In some embodiments, search service 1110 is based on a schema-less and graph based indexing architecture. Search service 1110 facilitates simple queries without having to search multiple levels of the hierarchical tree of the entity graph. For example, search service 1110 can return results based on searching of entity type, individual entities, attributes, or even relational objects without requiring other levels or entities of the hierarchy to be searched.

Figure 14:
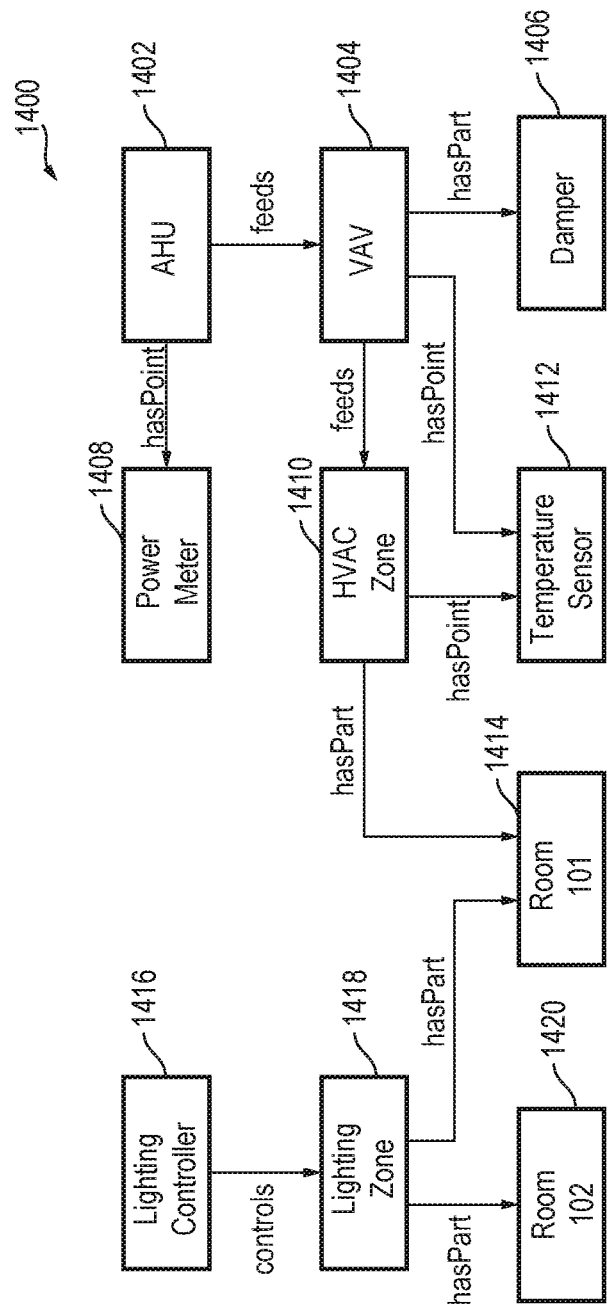
FIG. 14 is an example entity graph of entity data, according to some embodiments.

FIG. 14 is an example entity graph 1400 of entity data according to an embodiment of the present disclosure. The example of FIG. 14 assumes that an HVAC fault detection application has detected an abnormal temperature measurement with respect to temperature sensor 1412. However, temperature sensor 1412 itself may be operating properly, but may rely on various factors, conditions, and other systems and devices to measure the temperature properly. Accordingly, for example, the HVAC fault detection application may need to know the room 1414 in which the temperature sensor 1412 is located, the corresponding temperature setpoint, the status of the VAV 1404 that supplies conditioned air to the room 1414, the status of the AHU 1402 that feeds the VAV 1404, the status of the vents in the HVAC zone 1410, etc., in order to pin point the cause of the abnormal measurement. Thus, the HVAC fault detection application may require additional information from various related subsystems and devices (e.g., entity objects), as well as the zones and rooms (e.g., entity objects) that the subsystems and devices are configured to serve, to properly determine or infer the cause of the abnormal measurement.

Referring to FIG. 14, entity graph 1400 shows the relationship between temperature sensor 1412 and related entities via relational objects (e.g., feeds, hasPoint, hasPart, Controls, etc.). For example, entity graph 1400 shows that temperature sensor 1412 provides temperature readings (e.g., hasPoint) to VAV 1404 and HVAC zone 1410. AHU 1402 provides (e.g., feeds) VAV 1404 with chilled and/or heated air. AHU 1402 receives/provides power readings (e.g., hasPoint) from/to a power meter 1408. VAV 1404 provides (e.g., feeds) air to HVAC zone 1410 using (e.g., hasPart) a damper 1406. HVAC zone 1410 provides the air to room 1414. Further, rooms 1414 and 1420 are located in (e.g., hasPart) lighting zone 1418, which is controlled (e.g., controls) by lighting controller 1416.

Accordingly, in the example of FIG. 14, in response to receiving the faulty measurement from temperature sensor 1412, the HVAC fault detection application and/or analytics service 224 can determine from the entity graph that the fault could be caused by some malfunction in one or more of the other related entities, and not necessarily a malfunction of the temperature sensor 1412. Thus, the HVAC fault detection application and/or the analytics service 224 can further investigate into the other related entities to determine or infer the most likely cause of the fault.

Figure 15:
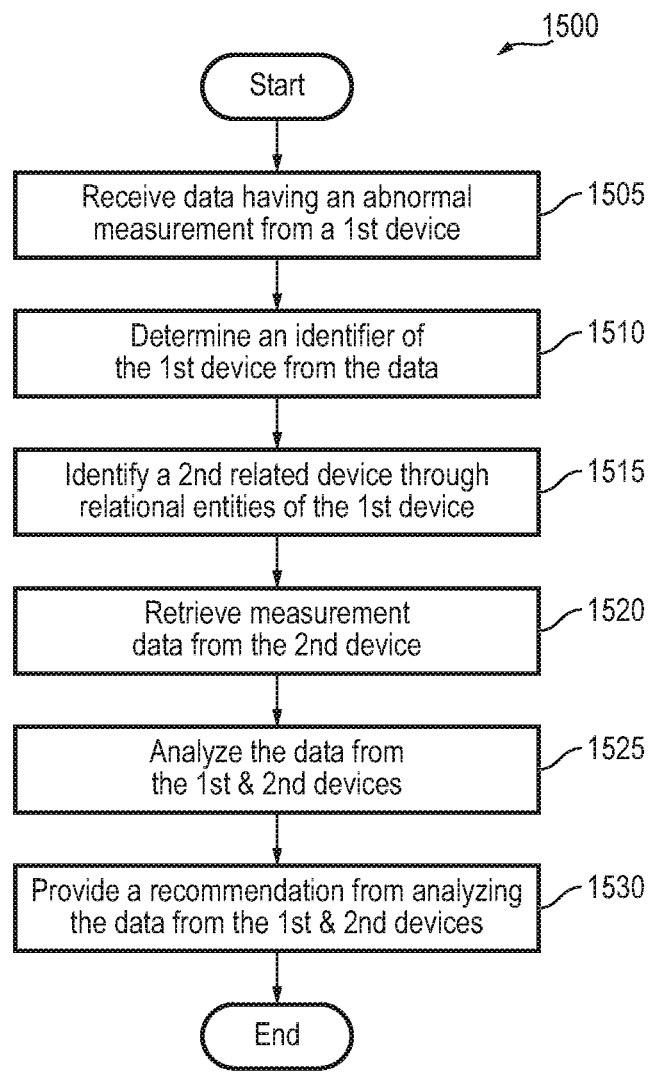
FIG. 15 is a flow diagram of a process or method for analyzing data from a second related device based on data from a first device, according to some embodiments.

For example, FIG. 15 is a flow diagram of a process 1500 for analyzing data from a second related device based on data from a first device, according to some embodiments. Referring to FIG. 15, process 1500 starts and data including an abnormal measurement is received from a first device at block 1505. Transformation service 1108 determines an identifier of the first device from the received data at block 1510. Transformation service 1108 identifies a second device that is related to the first device through relational objects associated with the first device at block 1515. The second device can be part of the same building subsystem as that of the first device or different building subsystem, and can be for a same building as that of the first device or different building. Transformation service 1108 invokes web service 1102 to retrieve measurement data from the second device at block 1520. Analytics service 224 analyzes the data from the first device and the second device at block 1525. Analytics service 224 provides a recommendation from the analysis of the data from each of the first device and the second device at block 1530, and process 1500 ends.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

The term "client or "server" include all kinds of apparatus, devices, and machines for processing data, including by way of example a programmable processor, a computer, a system on a chip, or multiple ones, or combinations of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A building system of a building comprising one or more non-transitory storage devices having instructions stored thereon that, when executed by one or more processors, cause the one or more processors to:
receive information technology (IT) data from one or more IT data sources via an IT network, the IT data associated with at least one of a plurality of entities of the building;
receive operational technology (OT) data from one or more OT data sources via an OT network, the OT data associated with at least one of the plurality of entities of the building; and
ingest the IT data and the OT data into a digital twin of the building, wherein the digital twin comprises contextual data representing the plurality of entities of the building and relationships between the plurality of entities, the relationships including semantic data describing semantic relationships between first entities of the plurality of entities and a second entities of the plurality of entities.

2. The building system of claim 1, wherein the IT data describes one or more characteristics of a plurality of devices of building equipment, people within the building, or spaces within the building, the one or more characteristics being static or changing at a first rate;
wherein the OT data describe one or more states or conditions of the plurality of devices of building equipment, people within the building, or spaces within the building, the one or more states or conditions being dynamic or changing at a second rate faster than the first rate.

3. The building system of claim 1, wherein the instructions cause the one or more processors to add new contextual data to the digital twin using the IT data or the OT data, the new contextual data based on one or more first attributes having first values derived from the IT data or one or more second attributes having second values derived from the OT data, wherein the new contextual data represents one or more new entities of the building or one or more new relationships between the one or more new entities and the plurality of entities.

4. The building system of claim 1, including a software gateway comprising one or more processing circuits;
wherein the one or more processing circuits of the software gateway are configured to use a different communication protocol of a plurality of communication protocols to communicate with each of a plurality of different data sources comprising at least some of the one or more IT data sources or the one or more OT data sources, the plurality of communication protocols comprising at least one of BACnet, Modbus, LonTalk, SQL, JMS, AMQP, MQTT, FTP, or HTTP.

5. The building system of claim 1, wherein the one or more IT data sources or the one or more OT data sources comprise at least two of internet of things (IoT) devices, building equipment, a weather service, a news service, a document service, or a media service.

6. The building system of claim 1, wherein the IT data describes at least one of a first relationship between a building equipment device and other building equipment devices or a second relationship between the building equipment device and a space within the building.

7. The building system of claim 1, wherein the OT data comprises event data received in real-time from building equipment installed within the building, the building equipment comprising at least one of a chiller, a boiler, a sensor, a cooling tower, and air handling unit, a rooftop unit, a variable air volume unit, lighting equipment, security equipment, or fire detection equipment.

8. The building system of claim 1, wherein the OT data comprise data samples collected from building equipment devices comprising at least one of sensors, actuators, electronics, vehicles, or home appliances.

9. The building system of claim 1, wherein the contextual data comprises a first attribute identifying a physical building equipment device and a second attribute storing a most recent value of a dynamic variable associated with the physical building equipment device.

10. The building system of claim 1, wherein the semantic data indicates a type of relationship of a plurality of types of relationships between the first entities and the second entities.

11. The building system of claim 10, wherein the semantic data indicates the type of relationship with an attribute.

12. A method of a building system comprising:
receiving, by one or more processing circuits, information technology (IT) data from one or more IT data sources via an IT network, the IT data associated with at least one of a plurality of entities of a building;
receiving, by the one or more processing circuits, operational technology (OT) data from one or more OT data sources via an OT network, the OT data associated with at least one of the plurality of entities of the building; and
ingesting, by the one or more processing circuits, the IT data and the OT data into a digital twin of the building, wherein the digital twin comprises contextual data representing the plurality of entities of the building and relationships between the plurality of entities, the relationships including semantic data describing semantic relationships between first entities of the plurality of entities and a second entities of the plurality of entities.

13. The method of claim 12, wherein the IT data describes one or more characteristics of a plurality of devices of building equipment, people within the building, or spaces within the building, the one or more characteristics being static or changing at a first rate;
wherein the OT data describes one or more states or conditions of the plurality of devices of building equipment, people within the building, or spaces within the building, the one or more states or conditions being dynamic or changing at a second rate faster than the first rate.

14. The method of claim 12, further comprising adding, by the one or more processing circuits, new contextual data to the digital twin using the IT data or the OT data, the new contextual data based on one or more first attributes having first values derived from the IT data or one or more second attributes having second values derived from the OT data, wherein the new contextual data represents one or more new entities of the building or one or more new relationships between the one or more new entities and the plurality of entities.

15. The method of claim 12, further comprising, implementing, by the one or more processing circuits, a software gateway;
wherein the software gateway uses a different communication protocol of a plurality of communication protocols to communicate with each of a plurality of different data sources comprising at least some of the one or more IT data sources or the one or more OT data sources, the plurality of communication protocols comprising at least one of BACnet, Modbus, LonTalk, SQL, JMS, AMQP, MQTT, FTP, or HTTP.

16. The method of claim 12, wherein the one or more IT data sources or the one or more OT data sources comprise at least two of internet of things (IoT) devices, building equipment, a weather service, a news service, a document service, or a media service.

17. The method of claim 12, wherein the IT data describe at least one of a first relationship between a building equipment device and other building equipment devices or a second relationship between the building equipment device and a space within the building.

18. The method of claim 12, wherein the OT data comprise event data received in real-time from building equipment installed within the building, the building equipment comprising at least one of a chiller, a boiler, a sensor, a cooling tower, and air handling unit, a rooftop unit, a variable air volume unit, lighting equipment, security equipment, or fire detection equipment.

19. The method of claim 12, wherein the OT data comprise data samples collected from building equipment devices comprising at least one of sensors, actuators, electronics, vehicles, or home appliances.

20. The method of claim 12, wherein the contextual data comprises a first attribute identifying a physical building equipment device and a second attribute storing a most recent value of a dynamic variable associated with the physical building equipment device.

21. One or more non-transitory storage devices configured to store instructions thereon that, when executed by one or more processing circuits, cause the one or more processing circuits to:
receive information technology (IT) data from one or more IT data sources via an IT network, the IT data associated with at least one of a plurality of entities of a building;
receive operational technology (OT) data from one or more OT data sources via an OT network, the OT data associated with at least one of the plurality of entities of the building; and
ingest the IT data and the OT data into a digital twin, wherein the digital twin comprises a plurality of data entities representing entities of the building and a plurality of relationships between the plurality of data entities representing relationships between the plurality of entities of the building, the plurality of relationships including semantic data describing semantic relationships between first entities of the plurality of entities and a second entities of the plurality of entities.

22. The one or more non-transitory storage devices of claim 21, wherein the IT data describe one or more characteristics of a plurality of devices of building equipment, people within the building, or spaces within the building, the one or more characteristics being static or changing at a first rate;
wherein the OT data describe one or more states or conditions of the plurality of devices of building equipment, people within the building, or spaces within the building, the one or more states or conditions being dynamic or changing at a second rate faster than the first rate.

* * * * *